US010278006B2

United States Patent
Chandrasekaran et al.

(10) Patent No.: US 10,278,006 B2
(45) Date of Patent: Apr. 30, 2019

(54) IDENTIFYING USER DEVICE STATUS VIA ROTATING CODES BROADCAST BY A BEACON DEVICE

(71) Applicant: GOOGLE INC., Mountain View, CA (US)

(72) Inventors: Sashikanth Chandrasekaran, Belmont, CA (US); Michal Palczewski, San Jose, CA (US); Varouj Chitilian, Hillsborough, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/440,973

(22) Filed: Feb. 23, 2017

(65) Prior Publication Data

US 2017/0245101 A1    Aug. 24, 2017

Related U.S. Application Data

(60) Provisional application No. 62/298,975, filed on Feb. 23, 2016.

(51) Int. Cl.
*H04W 4/02* (2018.01)
*H04W 4/80* (2018.01)
(Continued)

(52) U.S. Cl.
CPC ............. *H04W 4/02* (2013.01); *G01S 1/04* (2013.01); *G06Q 20/02* (2013.01); *G06Q 20/202* (2013.01);
(Continued)

(58) Field of Classification Search
CPC ...................................................... H04W 4/02
See application file for complete search history.

(56) References Cited

U.S. PATENT DOCUMENTS

| 2009/0061820 A1* | 3/2009 | Patel | H04L 63/0869 455/411 |
| 2011/0178883 A1* | 7/2011 | Granbery | G06Q 20/10 705/16 |
| 2015/0289295 A1* | 10/2015 | Granbery | H04B 5/04 370/230 |
| 2016/0021687 A1* | 1/2016 | Granbery | H04W 76/021 455/41.2 |

(Continued)

FOREIGN PATENT DOCUMENTS

| EP | 3 128 768 A1 | 2/2017 |
| WO | 2015/149032 A1 | 10/2015 |

(Continued)

OTHER PUBLICATIONS

Meister, "International Search Report and Written Opinion issued in International Application No. PCT/US2017/019159", dated May 12, 2017, 13 pages.

*Primary Examiner* — Christopher M Brandt
(74) *Attorney, Agent, or Firm* — Johnson, Marcou & Isaacs, LLC

(57) ABSTRACT

A user enters a location with a user device. A beacon device broadcasts a first beacon device code comprising a hardware identifier via a local wireless network at the location. A service application of the user device receives the first beacon device hardware identifier, logs a check-in status of the user, and transmits the check-in status to a service provider system. The beacon device generates, after a predetermined period of time, a subsequent beacon device code comprising a random number to broadcast at the location via the local wireless network. In response to receiving the subsequent beacon device code broadcast by the beacon device, the user device logs and transmits a subsequent check in status to the service provider system via the network. The service provider system provides services to the user device or another device at the location in accordance with the check-in status of the user device.

20 Claims, 10 Drawing Sheets

(51) Int. Cl.
| | |
|---|---|
| *G01S 1/04* | (2006.01) |
| *G06Q 20/02* | (2012.01) |
| *G06Q 20/20* | (2012.01) |
| *G06Q 20/24* | (2012.01) |
| *G06Q 20/32* | (2012.01) |
| *G06Q 20/40* | (2012.01) |
| *H04L 29/08* | (2006.01) |
| *H04W 4/04* | (2009.01) |

(52) U.S. Cl.
CPC ......... *G06Q 20/24* (2013.01); *G06Q 20/3224* (2013.01); *G06Q 20/405* (2013.01); *H04L 67/04* (2013.01); *H04L 67/146* (2013.01); *H04L 67/18* (2013.01); *H04L 67/22* (2013.01); *H04W 4/04* (2013.01); *H04W 4/80* (2018.02)

(56) References Cited

U.S. PATENT DOCUMENTS

| | | | | |
|---|---|---|---|---|
| 2016/0055474 | A1* | 2/2016 | Syed | G06Q 20/325 |
| | | | | 705/39 |
| 2016/0300185 | A1* | 10/2016 | Zamer | G06Q 10/0834 |
| 2016/0300216 | A1* | 10/2016 | Godsey | G06Q 20/325 |

FOREIGN PATENT DOCUMENTS

| | | | |
|---|---|---|---|
| WO | 2015/200414 | A1 | 12/2015 |
| WO | 2016/007445 | A1 | 1/2016 |
| WO | 2017/147315 | A1 | 8/2017 |
| WO | 2017/147315 | A8 | 10/2017 |

\* cited by examiner

200

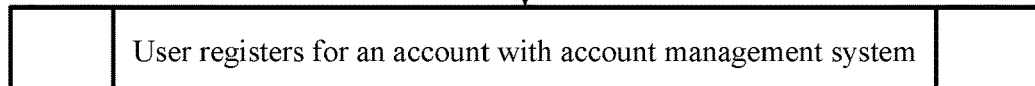
Enabling repeat detection of a beacon device at a location by an application operating in the background of a user computing device operating system via periodically changing a hardware identifier of the beacon device

210

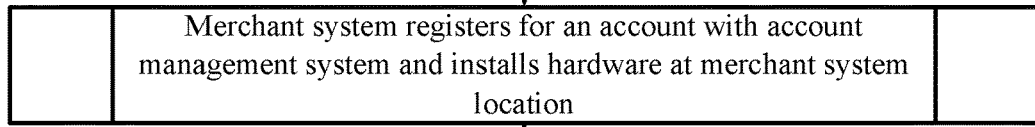
User registers for an account with account management system

220

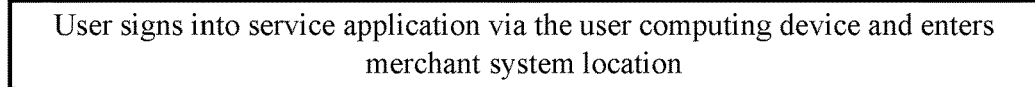
Merchant system registers for an account with account management system and installs hardware at merchant system location

230

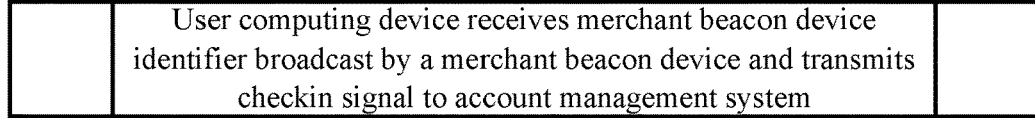
User signs into service application via the user computing device and enters merchant system location

240

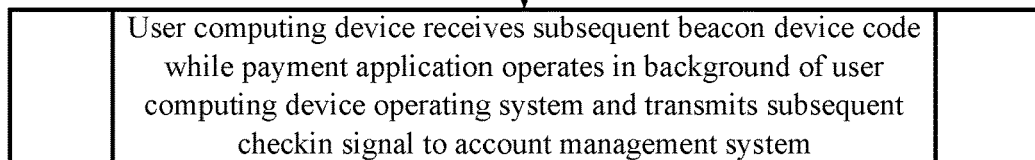
User computing device receives merchant beacon device identifier broadcast by a merchant beacon device and transmits checkin signal to account management system

250

User computing device receives subsequent beacon device code while payment application operates in background of user computing device operating system and transmits subsequent checkin signal to account management system

260

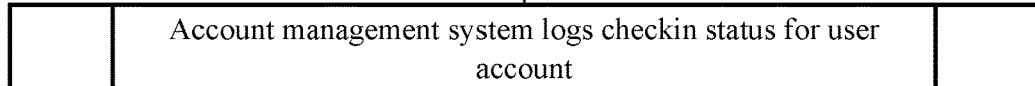
Account management system logs checkin status for user account

270

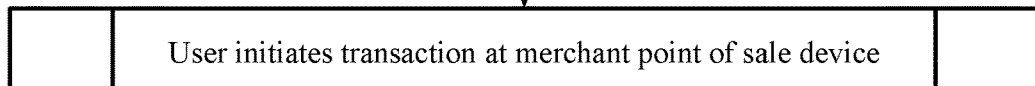
User initiates transaction at merchant point of sale device

280

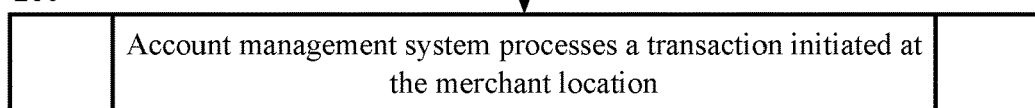
Account management system processes a transaction initiated at the merchant location

Figure 2

240
Receiving, by a user computing device, a beacon device code broadcast by a beacon device and transmitting a checkin signal to an account management system 510
User carries user computing device within a threshold distance of beacon device at merchant system location 520
User computing device receives beacon device code broadcasted by beacon device 530
User computing device transmits checkin signal and user account identifier to account management system 540
Account management system receives checkin signal and user account identifier 550
Account management system logs receipt of checkin signal and user account identifier and designates user account as checked in 250, Fig. 2

Figure 5

IDENTIFYING USER DEVICE STATUS VIA ROTATING CODES BROADCAST BY A BEACON DEVICE

CROSS REFERENCE TO RELATED APPLICATION

This application claims priority to U.S. Provisional Patent Application No. 62/298,975 filed Feb. 23, 2016, and entitled "Identifying User Device Status Via Rotating MAC Addresses On A beacon Device," the entire contents of which are hereby fully incorporated herein by reference.

TECHNICAL FIELD

The present disclosure is directed to logging the location of user computing devices at locations, and more particularly to logging the location of user computing devices via receiving beacon device hardware identifiers from beacon devices installed at particular locations.

BACKGROUND

Merchant systems, payment processing systems, and other service-providing systems that provide services to users may utilize a check-in status of a user computing device to determine whether a customer associated with the user computing device is at a location before providing services associated with the location. A service-providing system may provide a service application to the user computing device, and the user computing device may initiate a check-in status via the service application by detecting, via the user computing device, a beacon device installed at the location by receiving a hardware identifier from the beacon device via a wireless communication channel. The service-providing system may receive a check-in status signal from the application in response to the user computing device detecting the beacon device. The user computing device may provide the check-in status signal to the service-providing system at predetermined time intervals in response to re-detecting the beacon device at the location. The service-providing system may continue to maintain a check-in status for the user computing device if the system continues to receive check-in status signals from the user computing device. Currently, however, some user computing device operating environments are constrained in that service applications operating in the background of the operating environment are not able to subsequently detect a particular beacon device after initially receiving data from the particular beacon device.

SUMMARY

Techniques herein provide computer-implemented methods to enable repeat detection of a particular beacon device at a location by an application operating in the background of a user computing device operating system via periodically changing a hardware identifier of the particular beacon device. A user establishes an account with a service provider system via a user computing device and downloads/installs a service application associated with the service provider system to the user computing device via a network. The service provider system or a system associated with the service provider system is associated with a beacon device installed at a location. A user signs into the service application via the service application operating on the user computing device. In an example, when the user signs into the service application, the service application operates in a foreground of the operating system of the user computing device. In this example, if the user selects another application on the user computing device, the service application operates in a background of the operating system while the other application operates in the foreground of the operating system. In another example, the user computing device operates in a sleep mode or other power-saving mode wherein the user interface of the user computing device is deactivated and wherein the service application operates in the background of the operating system of the user computing device. The user enters the location associated with the installed beacon device with the user computing device. The beacon device broadcasts a first beacon device hardware identifier and other data at the location via a local wireless network. The service application operating in the background of the user computing device operating system receives the first beacon device hardware identifier and the other data from the beacon device via the local wireless network at the location. In response to receiving the beacon device hardware identifier, the service application operating in the background of the user computing device operating system logs a check in status of the user at the location and transmits a check in status signal to the service provider system via the network. After broadcasting the first beacon device hardware identifier for a predetermined period of time, the beacon device generates, via, for example, a random number generator, a subsequent beacon device hardware identifier and broadcasts the subsequent beacon device hardware identifier along with the other data at the location via the local wireless network. For example, after each predetermined period of time passes, the beacon device randomly generates a new beacon device hardware identifier to broadcast at the location along with the other data. The service application operating in the background of the user computing device operating system receives the subsequent beacon device hardware identifier and the other data from the beacon device via the local wireless network at the location. In response to receiving the subsequent beacon device hardware identifier from the beacon device, the service application operating in the background of the user computing device operating system logs a subsequent check in status of the user at the location and transmits a subsequent check in status signal to the service provider system via the network. The service provider system may provide services or data to the user computing device or another computing device at the location while the service provider system maintains a check-in status of the user at the location. The service provider system may log a checked-out or a not-checked-in status if the service provider system does not receive a subsequent check in status signal from the user computing device within a predetermined length of time after receiving a previous check-in status signal from the user computing device.

In certain other example aspects described herein, systems and computer program products to enable repeat detection of a particular beacon device at a location by an application operating in the background of a user computing device operating system via periodically changing a hardware identifier of the particular beacon device are provided.

These and other aspects, objects, features, and advantages of the examples will become apparent to those having ordinary skill in the art upon consideration of the following detailed description of illustrated examples.

BRIEF DESCRIPTION OF THE DRAWINGS

FIG. 2 is a block flow diagram depicting a method for enabling repeat detection of a beacon device at a location by a payment application operating in the background of a user computing device operating system via periodically changing a hardware identifier of the beacon device, in accordance with certain examples.

FIG. 5 is a block flow diagram depicting a method for receiving, by a user computing device, a merchant beacon device code broadcasted by a merchant beacon device and transmitting a checkin signal to an account management system, in accordance with certain examples.

DETAILED DESCRIPTION OF EXAMPLES

Overview

Figure 1:
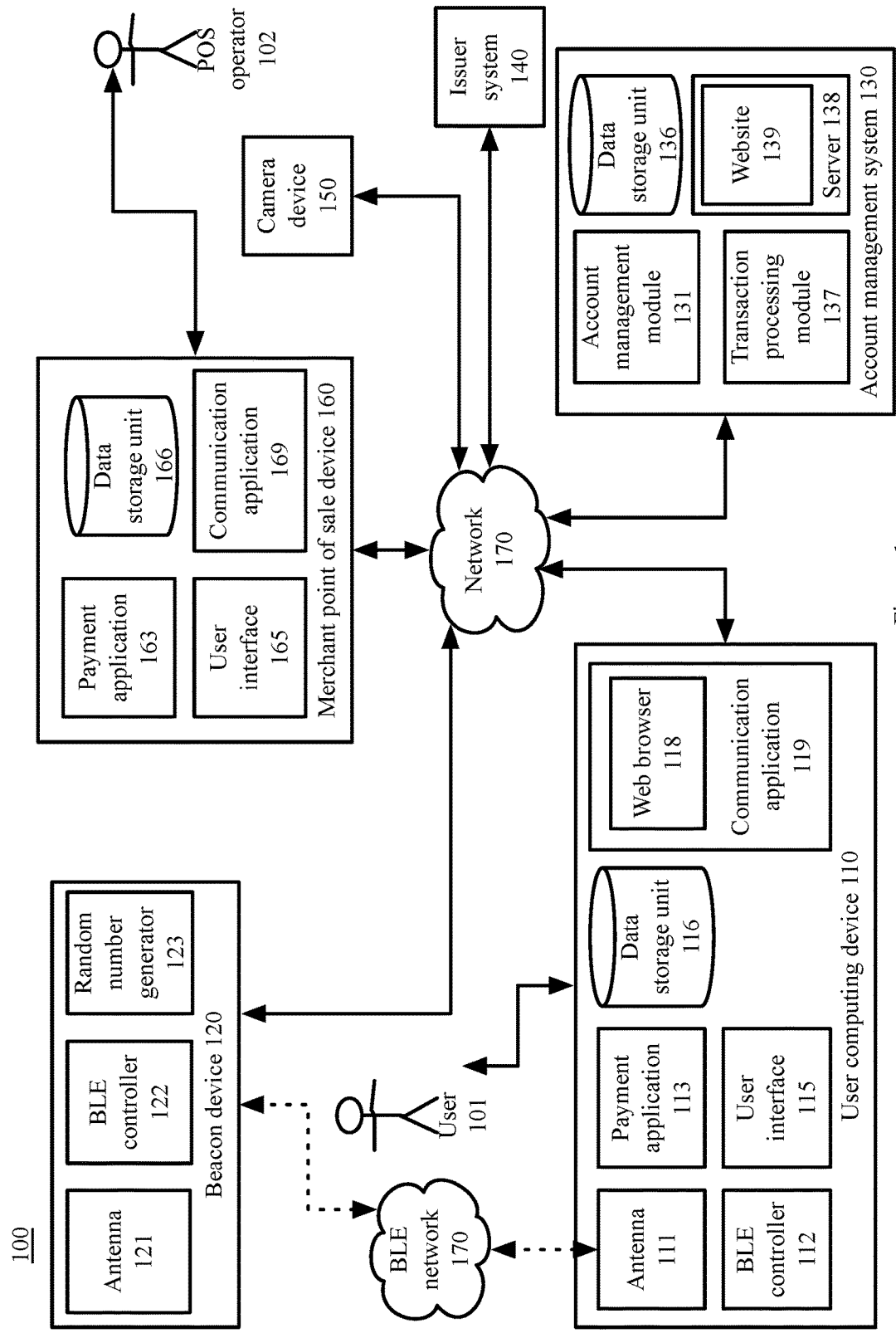
FIG. 1 is a block diagram depicting a system to enable repeat detection of a beacon device at a location by a payment application operating in the background of a user computing device operating system via periodically changing a hardware identifier of the beacon device, in accordance with certain examples.

With reference to FIG. 1, the examples described herein provide computer-implemented techniques to enable repeat detection of a beacon device 120 at a location by a service application 113 operating in the background of a user computing device 110 operating system via periodically changing a hardware identifier of the beacon device 120, in accordance with certain examples.

In an example, a user 101 establishes an account with a service provider system 130 via the user computing device 110 and downloads/installs the service application 113 associated with the service provider system 130 to the user computing device 110 via a network 170. In an example, the user 101 registers with the service provider system 130. For example, the user 101 accesses a service provider system website 139 via the user computing device 110 associated with the user 101. The user 101 registers with the service provider system 130 and downloads the service application 113 onto the user computing device 110. In an example, the user 101 uploads data to the user 101 account via the service provider system 130 via the service application 113, such as financial account data.

In an example, the service provider system 130 or a system associated with the service provider system 130, such as a merchant system, includes one or more beacon devices 120 installed at a location. For example, a merchant installs the one or more beacon devices 120 at a merchant system location, such as a brick and mortar store location of the merchant. In this example, the merchant and/or the service provider system 130 configures each beacon device 120 at the location to broadcast a respective merchant beacon device 120 hardware identifier via a wireless communication network, for example, a Bluetooth Low-Energy ("BLE") network 180, at the location. For example, the hardware identifier comprises a media access control address ("MAC address") or other hardware identifier associated with the respective beacon device 120. In certain examples, the merchant and/or the service provider system 130, in addition to the one or more beacon devices 120, may install one or more point of sale devices 160, one or more camera devices 150, and/or one or more other computing devices at the location.

The user 101 signs in to the service application 113 on the user computing device 110 and enters the location associated with the installed beacon device. In an example, when the user 101 signs into the service application 113, the service application 113 operates in a foreground of the operating system of the user computing device 110. In this example, if the user 101 selects another application on the user computing device 110, the service application 113 ceases to operate in the foreground and begins operating in a background of the operating system while the other application operates in the foreground of the operating system of the user computing device 110. In another example, the user computing device 110 operates in a sleep mode or other power-saving mode wherein the user interface 111 of the user computing device is deactivated and wherein the service application 113 operates in the background of the operating system of the user computing device. 110. In an example, only one application on the user computing device 110 may run in the foreground at a time. In this example, applications operating in the background have limited processing capabilities whereas an application operating in the foreground is able to freely execute on the user computing device 110. More specifically, the service application 113 executing in the background of the operating system may not continue to detect a particular beacon device 120, because the particular beacon device 120 broadcasts the same MAC address. The service application 113 initially detects the particular beacon device 120 based on the broadcast MAC address. Thereafter, the service application only detects MAC addresses for beacon devices that are different from the MAC address for the particular beacon device. The user 101 enters the location associated with the installed beacon device 120. For example, the user 101 enters the location with the user computing device 110. In an example, the user 101 carries the user computing device 110 within a distance of the beacon device 120 at the location, where the distance is within a detection range of the beacon device 120. In an example, the beacon device 120 at the location, broadcasts a first beacon device 120 hardware identifier and other data at the location via the Bluetooth Low-Energy ("BLE") network 180 or other wireless network at the location. In an example, the beacon device 120 broadcasts the hardware identifier and other data at the location via another type of local wireless network, for example, a Bluetooth network or near field communication ("NFC") network. In an example, the other data comprises a beacon device 120 name, BLE network 180 connection name, or other data.

In an example, the service application 113 operating in the background or foreground of the user computing device 110 operating system receives the first beacon device 120 hardware identifier and the other data from the beacon device 120 via the BLE network 180 or other wireless network at the location. In response to receiving the beacon device 120 hardware identifier, the service application 113 logs a check in status of the user 101 at the location and transmits a check-in status signal to the service provider system 130 via the network 170. In an example, the service provider system 130 maintains a log of current user computing devices 110 currently checked in at the location associated with the beacon device 120. After broadcasting the first beacon device 120 hardware identifier for a predetermined period of time, the beacon device 120 generates, via a random number generator 123, a subsequent beacon device 120 hardware identifier and broadcasts the subsequent beacon device 120 hardware identifier along with the other data at the location via the BLE network 180 or other local wireless network. Example beacon device 120 hardware identifiers comprise a randomly generated succession of alphanumeric and/or symbolic characters. For example, after each predetermined period of time passes, the beacon device randomly generates a new beacon device 120 hardware identifier to broadcast at the location along with the other data via the BLE network 180 or other local wireless network at the location.

The service application 113 operating in the background of the user computing device 110 operating system receives the subsequent beacon device 120 hardware identifier and the other data from the beacon device 120 via the BLE network 180 or other local wireless network at the location. In response to receiving the subsequent beacon device 120 hardware identifier from the beacon device 120, the service application 113 operating in the background of the user computing device 110 operating system logs a subsequent check-in status of the user 101 at the location and transmits a subsequent check in status signal to the service provider system 130 via the network 170. The service provider system 130 may provide services or data to the user computing device 110 or another computing device at the location while the service provider system 130 maintains a check-in status of the user 101 at the location. The service provider system may log a checked-out or a not-checked-in status if the service provider system does not receive a subsequent check-in status signal from the user computing device 110 via the network 170 within a threshold length of time after receiving a previous check-in status signal from the user computing device 110.

In an example, the point of sale device 160 ("POS device") may only process a transaction using data associated with the service provider system 130 if the user 101 is currently checked in at the location. In another example, the POS device 160 cannot process a transaction using data associated with the service provider system 130 if the user 101 is not currently checked in at the location. In an example, the POS device 160 may request that the service provider system 130 process a transaction with data associated with the user 101 in response to initiation of the transaction by a POS device operator 102. In this example, the service provider system 130 accesses a check-in log associated with the location. If the user 101 is currently logged as checked in at the location, the service provider system communicates with an issuer system 140 to process a transaction using data associated with the user 101 maintained in an account by the service provider system 130. In this example, if the user 101 is not currently logged as checked in at the location, the service provider system transmits a message to the POS device 160 that the transaction cannot be processed.

Conventional applications for maintaining a check-in status of a user computing device at a location do not enable the user computing device to send check-in status signals via an application operating in the background of the user computing device via periodically receiving a subsequent hardware identifier from the same beacon device at the location. By using and relying on the methods and systems described herein, the service provider system 130, the beacon device 120, and the user computing device 110 enable repeat detection of a beacon device 120 at a location by a payment application 113 operating in the background of an operating system of a user computing device 110 via periodically changing a code broadcast by the beacon device 120.

Example System Architecture

Turning now to the drawings, in which like numerals indicate like (but not necessarily identical) elements throughout the figures, examples are described in detail.

FIG. 1 is a block diagram depicting a system 100 to enable repeat detection of a beacon device 120 at a location by a service application 113 of a user computing device 110 via periodically changing a hardware identifier of the beacon device 120, in accordance with certain examples. As depicted in FIG. 1, the system 100 includes network computing devices 110, 120, 130, 140, 150, and 160 that are configured to communicate with one another via one or more networks 170. In some embodiments, a user associated with a device must install an application and/or make a feature selection to obtain the benefits of the techniques described herein.

In examples, the network 170 can include a local area network ("LAN"), a wide area network ("WAN"), an intranet, an Internet, a storage area network ("SAN"), a personal area network ("PAN"), a metropolitan area network ("MAN"), a wireless local area network ("WLAN"), a virtual private network ("VPN"), a cellular or other mobile communication network, Wi-Fi, Bluetooth, Bluetooth low energy ("BLE"), NFC, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 120, 130, 140, 150, and 160 includes a device having a communication module capable of transmitting and receiving data over the network 170. For example, each network computing device 110, 130, 140, 150, and 160 can include a server, desktop computer, laptop computer, tablet computer, a television with one or more processors embedded therein and/or coupled thereto, smart phone, handheld computer, personal digital assistant ("PDA"), a beacon device, or any other wired or wireless, processor-driven device. In the example depicted in FIG. 1, the network computing devices 110, 120, 130, 140, 150, and 160 are operated by users 101, beacon device 120 operators, service provider system 130 operators, issuer system 140 operators, camera device 150 operators, point of sale ("POS") device 160 operators, and payment processing system 160 operators, respectively.

In the example depicted in FIG. 1, the network computing device 110 is embodied as a user computing device 110. An example user computing device 110 comprises an antenna 111, a Bluetooth low energy ("BLE") controller 112, a service application 113, a user interface 115, a data storage unit 116, a web browser 118, and a communication application 119.

In an example, the antenna 111 is a hardware device for communication between the user computing device 110 and a beacon device 120, and with the network 170. In an example, a BLE controller 112 outputs through the antenna 111 a signal, or receives signals from the beacon device 120 over a BLE network 180 or other local wireless network at the location. In another example a Bluetooth controller or a near field communication ("NFC") controller is used.

In an example, the BLE controller 112 is capable of sending and receiving data, performing authentication and ciphering functions, directing how the user computing device 110 will listen for and receive transmissions from the beacon device 120, or configuring the user computing device 110 into various power-save modes according to BLE-specified procedures. In another example, the user computing device 110 comprises a Bluetooth controller, Wi-Fi controller, or an NFC controller capable of performing similar functions. An example BLE controller 112 communicates with the service application 113 and is capable of sending and receiving data over the wireless, BLE network 180. In another example, a Bluetooth controller 112 or NFC controller 112 performs similar functions as the BLE controller 112 using Bluetooth or NFC protocols. In an example, the BLE controller 112 activates the antenna 111 to create a wireless communication channel, such as a BLE communication channel, between the user computing device 110 and the beacon device 120. The user computing device 110 communicates with the beacon device 120 via the antenna 111. In an example, when the user computing device 110 has been activated, the BLE controller 112 polls through the antenna 111 a signal, or listens for and receives signals from the beacon device 120.

In an example, the service application 113 is a program, function, routine, applet, or similar entity that exists on and performs its operations on the user computing device 110, executing in an operating system of the user computing device 110. In certain examples, the user 101 must install the service application 113 and/or make a feature selection on the user computing device 110 to obtain the benefits of the techniques described herein. In an example, the user 101 may access the service application 113 on the user computing device 110 via the user interface 115. In an example, the service application 113 may be associated with the service provider system 130. In another example, the service application 113 may be associated with a merchant system associated with a beacon device 120, a point of sale device 150, and/or a camera device 150 at the location.

In an example, the user interface 115 enables the user 101 to interact with the service application 113 and/or web browser 118. For example, the user interface 115 may be a touch screen, a voice-based interface, or any other interface that allows the user 101 to provide input and receive output from an application or module on the user computing device 110. In an example, the user 101 interacts via the user interface 115 with the service application 113 and/or web browser 118 to configure user 101 accounts on the service provider system 130. In another example, the user 101 interacts via the user interface 115 with the service application 113 and/or the web browser 118 to enable services provided by the service provider system 130, such as hands-free payments, if needed.

In an example, the data storage unit 116 comprises a local or remote data storage structure accessible to the user computing device 110 suitable for storing information.

In an example, the user 101 can use a communication application 119, such as a web browser 118 application or a stand-alone application, to view, download, upload, or otherwise access documents or web pages via the network 170.

In an example, the web browser 118 can enable the user 101 to interact with web pages using the user computing device 110. In an example, the user 101 may access the user's 101 account maintained by the service provider system 130 via the web browser 118. In another example, the user 101 may access a service provider system website 139 via the web browser 118. In certain examples described herein, one or more functions performed by the service application 113 may also be performed by a web browser 118 application associated with the service provider system 130.

In an example, the communication application 119 can interact with web servers or other computing devices connected to the network 170, including the user computing device 110 and a web server 138 of the service provider system 130.

In certain examples, one or more functions herein described as performed by the service application 113 may also be performed by a web browser 118 application, for example, a web browser 118 application associated with a service provider system 130 website 139 or associated with the service provider system 130. In certain examples, one or more functions herein described as performed by the service application 113 may also be performed by the user computing device 110 operating system. In certain examples, one or more functions herein described as performed via the web browser 118 may also be performed via the service application 113.

In the example depicted in FIG. 1, the network computing device 120 is embodied as a beacon device 120. An example beacon device 120 comprises an antenna 121, a BLE controller 122, and a random number generator 123. The example beacon device 120 is programmed to broadcast, emit, or otherwise transmit a particular merchant beacon device 120 hardware identifier and other data associated with the beacon device 120 over a BLE network 180 or other local wireless network to any user computing devices 110 within communication range of the beacon device 120. In another example, the BLE network 180 may instead comprise Bluetooth network, an NFC network, or any other appropriate local wireless network, and the beacon device 120 may correspondingly comprise a Bluetooth network controller, an NFC network controller, or any other appropriate local wireless network controller.

In an example, the antenna 121 is a hardware component for communication between the user computing device 110 and the beacon device 120 installed at the location. In an example, the BLE controller 122 outputs through the antenna 121 a signal, or listens for and receives signals from the user computing device 110. In another example, a Bluetooth controller or a near field communication ("NFC") controller is used.

In an example, the BLE controller 122 is capable of sending and receiving data, performing authentication and ciphering functions, and directing how the beacon device 120 will listen for transmissions from the user computing device 110 or configuring the beacon device 120 into various power-save modes according to BLE-specified procedures. In another example, the beacon device 120 comprises a Bluetooth controller or an NFC controller capable of performing similar functions. An example BLE controller 122 communicates with the service application 113 and is capable of sending and receiving data over a wireless, BLE communication channel. In another example, a Bluetooth controller or NFC controller performs similar functions as the BLE controller 122 using Bluetooth or NFC protocols. In an example, the BLE controller 122 activates the antenna 121 to create a wireless communication channel between the user computing device 110 and the beacon device 120. The beacon device 120 communicates with the user computing device 110 via the antenna 121. In an example, when the beacon device 120 has been activated, the BLE controller 122 polls through the antenna 121 a signal, or listens for and receives signals from the user computing device 110.

An example random number generator 123 generates beacon device 120 hardware identifiers. An example beacon device 120 hardware identifier comprises a media access control ("MAC") address. In an example, the random number generator 123 generates a subsequent MAC address or other hardware identifier at periodic time intervals, for example, every five minutes. In an example, the random number generator 123 communicates the subsequently generated hardware identifier to the BLE controller 122, and the BLE controller 122 ceases broadcasting a previous beacon device 120 hardware identifier and broadcasts the subsequently generated beacon device 120 hardware identifier via the BLE network 180 at the location.

In the example depicted in FIG. 1, the network computing device 130 is embodied as a service provider system 130. An example service provider system 130 comprises an account management module 131, a data storage unit 136, a transaction processing module 137, a server 138, and a website 139.

In an example, the account management module 131 manages one or more user 101 accounts. In an example, a user 101 account may comprise a digital wallet account, an email account, a social networking account, or any other appropriate account associated with the service provider system 130. In an example, the account management module 131 communicates with the service application 113 operating on a user computing device 110 associated with a user 101 having a user 101 account with the service provider system 130. In an example, the user 101 enters data, such as payment account information, into the user 101 account via the service application 113, and the account management module 131 receives the data over the network 170 and associates the received data with the user 101 account.

In an example, the data storage unit 136 comprises a local or remote data storage structure accessible to the service provider system 130 suitable for storing information.

In an example, the processing module 137 receives data from a merchant point of sale ("POS") device 160 or from another device at the location and a request to initiate a transaction or to provide a service. In an example, the processing module 137 receives the transaction request or service request and accesses a log comprising a list of user computing devices 110 currently checked in at the location associated with the beacon device 120. In an example, the processing module 137 extracts account information from the user 101 account in response to determining that the user computing device 110 is checked in at the location. In another example, the processing module 137 determines that the user computing device 110 is not checked in at the location. In an example, if the user computing device 110 is checked in at the location, the transaction processing module 137 transmits an authorization request to a third party system, such as an issuer system 140 or other appropriate system. For example, an example payment authorization request may comprise merchant system payment account information, user 101 payment account information, and a total amount of the transaction. In this example, after the issuer system 140 or other appropriate system processes the payment authorization request or service request, the processing module 137 receives an approval or denial of the payment authorization request or service request from the issuer system 140 or other appropriate system over the network 170. In this example, the processing module 137 transmits a receipt to the merchant POS device 160 and/or the user computing device 110 comprising a summary of the transaction or service request.

In the example depicted in FIG. 1, the network computing device 140 is embodied as an issuer system 140. An example issuer system 140 approves or denies a payment authorization request received from the service provider system 130. In an example, the issuer system 140 communicates with the service provider system 130 over the network 170. In an example, the issuer system 140 communicates with an acquirer system (not depicted) to approve a credit authorization and to make payment to the service provider system 130 and/or merchant system. For example, the acquirer system is a third party payment processing company.

In the example depicted in FIG. 1, the network computing device 150 is embodied as a camera device 150. An example camera device 150 comprises a processor, a data storage unit, a camera module, and a communication application (not depicted). In an example, the camera device 150 is installed at a location proximate to the beacon device 120. For example, the camera device 150 and the beacon device 120 are installed at a common merchant system store location. In an example, the camera processor performs one or more functions described herein as being performed by the merchant camera device 150. In an example, the data storage unit of the camera device 150 comprises a local or remote data storage structure accessible to the camera device 150 suitable for storing information. In an example, the camera module of the camera device 150 may be any module or function of the camera device 150 that captures a video input or captures a digital image of an external environment of the camera device 150. The camera module may be resident on the camera device 150 or in any manner logically connected to the camera device 150. For example, the camera module may be connected to the camera device 150 via the network 170. The camera module may be capable of obtaining individual images or a video scan. Any other suitable image capturing device may be represented by the camera module of the camera device 150. In an example, the communication application of the camera device 150 enables the merchant camera device 150 to communicate with a server 138 of the service provider system 130.

In the example depicted in FIG. 1, the network computing device 160 is embodied as a point of sale device 160. An example point of sale device 160 comprises a payment application 163, a user interface 165, a data storage unit 166, and a communication application 169.

In an example, the payment application 163 is a program, function, routine, applet, or similar entity that exists on and performs its operations on the point of sale device 160. In certain examples, the point of sale ("POS") device operator 102 or other merchant system operator must install the payment application 163 and/or make a feature selection on the point of sale device 160 to obtain the benefits of the techniques described herein. In an example, the POS device operator 102 may access the payment application 163 on the POS device 160 via the user interface 165. In an example, the payment application 163 may be associated with the service provider system 130. In another example, the payment application 163 may be associated with a merchant system associated with the beacon device 120 and the camera device 150 installed at the location.

In an example, the user interface 165 enables the POS device operator 102 to interact with the POS device 160. For example, the user interface 165 may be a touch screen, a voice-based interface, or any other interface that allows the POS device operator 102 to provide input and receive output from an application or module on the POS device 160. In an example, the POS device operator 102 interacts via the user interface 165 with the payment application 163.

In an example, the data storage unit 166 comprises a local or remote data storage structure accessible to the merchant POS device 160 suitable for storing information.

In an example, the communication application 169, such as a web browser application or a stand-alone application, enables an operator of the POS device 160 to view, download, upload, or otherwise access documents or web pages via a distributed network 170. For example, the communication application 169 may enable communication over the network 170 with the payment processing system 160.

It will be appreciated that the network connections shown are examples and other means of establishing a communications link between the computers and devices can be used. Moreover, those having ordinary skill in the art having the benefit of the present disclosure will appreciate that the user computing device 110, the beacon device 120, the service provider system 130, the issuer system 140, the camera device 150, and the point of sale device 160 illustrated in FIG. 1 can have any of several other suitable computer system configurations. For example, a user computing device 110 embodied as a mobile phone or handheld computer may or may not include all the components described above.

In examples, the network computing devices and any other computing machines associated with the technology presented herein may be any type of computing machine such as, but not limited to, those discussed in more detail with respect to FIG. 2. Furthermore, any functions, applications, or components associated with any of these computing machines, such as those described herein or any other others (for example, scripts, web content, software, firmware, hardware, or modules) associated with the technology presented herein may by any of the components discussed in more detail with respect to FIG. 2. The computing machines discussed herein may communicate with one another, as well as with other computing machines or communication systems over one or more networks, such as networks 170 and 180. The networks 170 and 180 may include any type of data or communications network, including any of the network technology discussed with respect to FIG. 2.

Example Processes

The example methods illustrated in FIGS. 2-9 are described hereinafter with respect to the components of the example operating environment 100. The example methods of FIGS. 2-9 may also be performed with other systems and in other environments.

FIG. 2 is a block diagram depicting a method 200 for enabling repeat detection of a beacon device 120 at a location by a payment application 113 operating in the background of a user computing device 110 operating system via periodically changing a hardware identifier of the beacon device, in accordance with certain examples. The method 200 is described with reference to the components illustrated in FIG. 1.

In block 210, the user 101 registers for an account with the account management system 130. The method for registering, by a user 101, for an account with an account management system 130 is described in more detail hereinafter with reference to the method described in FIG. 3.

Figure 3:
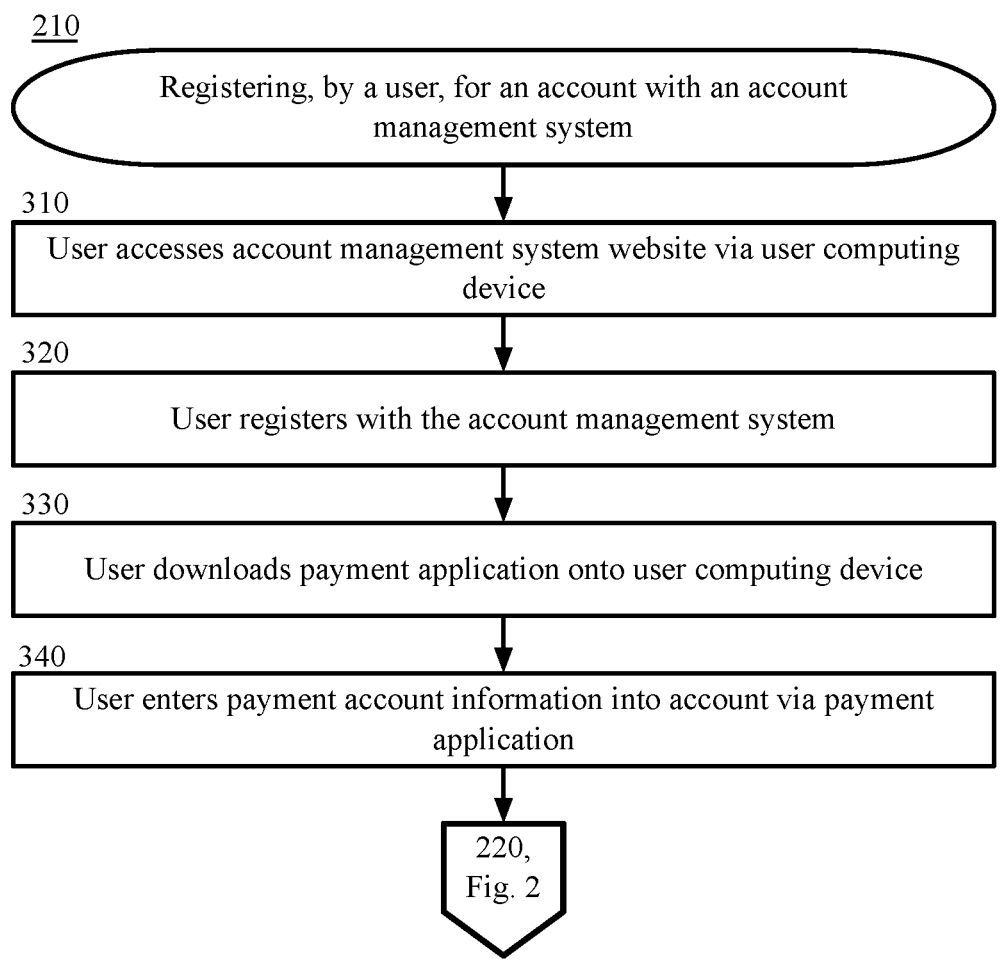
FIG. 3 is a block flow diagram depicting a method for registering, by a user, for an account with an account management system, in accordance with certain examples.

FIG. 3 is a block diagram depicting a method 210 for registering, by a user 101, with an account management system 130. The method 210 is described with reference to the components illustrated in FIG. 1.

In block 310, the user 101 accesses an account management system 130 website 139 via the user computing device 110. For example, the user 101 accesses the account management system website 139 via the web browser 118 of the user computing device 110. In another example, the user 101 may otherwise contact the account management system 130 to register for a user 101 account.

In block 320, the user 101 registers with the account management system 130. The user 101 may obtain a user 101 account number, receive the appropriate applications and software to install on the user computing device 110, request authorization to participate in hands-free payment processing, or perform any action required by the account management system 130. The user 101 may utilize the functions of the user computing device 110, such as the user interface 111 and the web browser 118, to register and configure a user 101 account. In an example, the user 101 may enter payment account information associated with one or more user 101 accounts, for example, one or more credit accounts, one or more bank accounts, one or more stored value accounts, and/or other appropriate accounts into the user 101 account maintained by the account management system 130.

In block 330, the user 101 downloads a payment application 113 onto the user computing device 110. In an example, the payment application 113 operating on the user computing device 110 is able to communicate with the account management system 130 over the network 170.

In block 340, the user 101 enters payment account information into the account via the payment application 113. In an example, the user 101 may configure user 101 account settings or add, delete, or edit payment account information via the payment application 113. In an example, the user 101 may select an option to enable or disable the permission of the account management system 130 to process hands free transactions. For example, a hands free transaction comprises a transaction wherein the user 101 does not need to interact with the user computing device 110 or requires minimal user 101 interaction with the user computing device 110 to initiate a transaction with the merchant system.

From block 340, the method 210 proceeds to block 220 in FIG. 2.

Returning to FIG. 2, in block 220, the merchant system registers for an account with the account management system 130 and installs hardware at the merchant system location. The method for registering, by a merchant system, with an account management system 130 and installing hardware at a merchant system location is described in more detail hereinafter with reference to the method described in FIG. 4.

Figure 4:
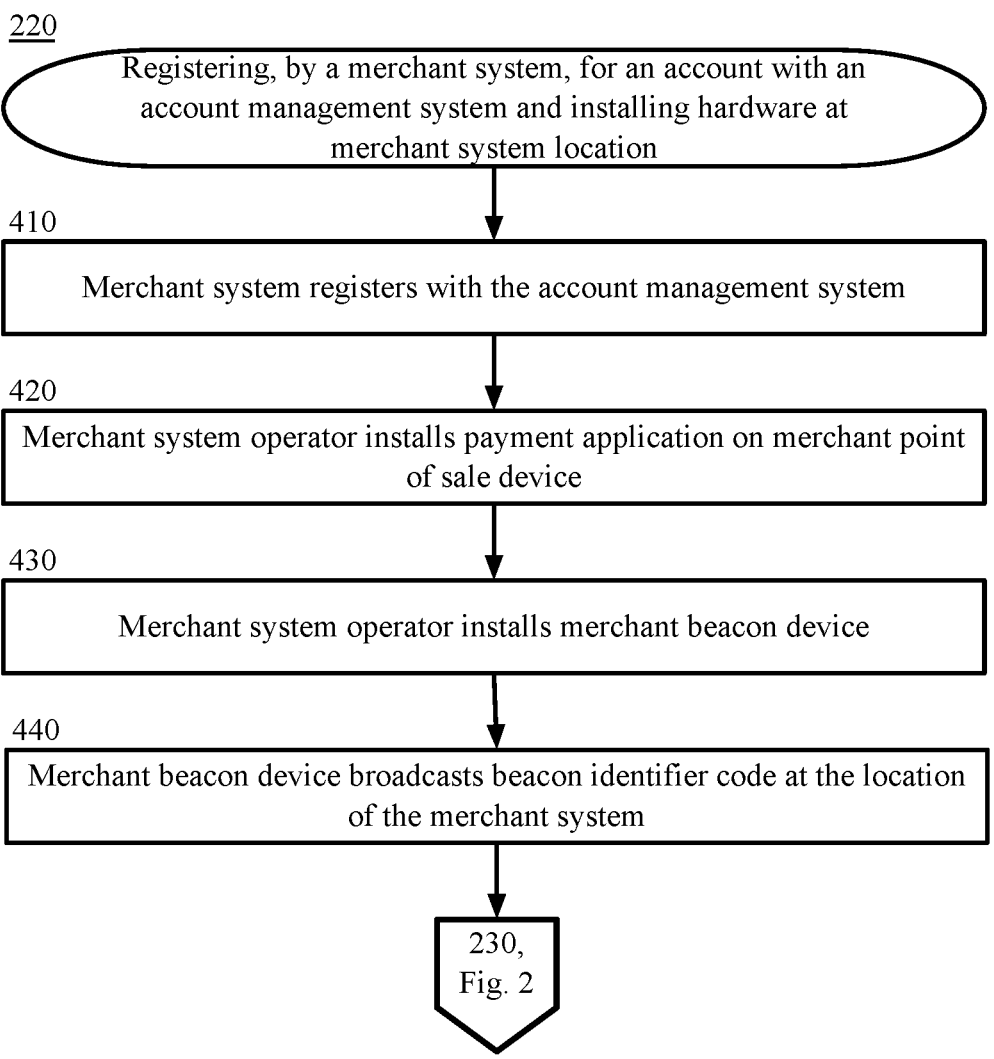
FIG. 4 is a block flow diagram depicting a method for registering, by a merchant system, for an account with an account management system and installing hardware at merchant system location, in accordance with certain examples.

FIG. 4 is a block diagram depicting a method 220 for registering, by a merchant system, with an account management system 130 and installing hardware at a merchant system location, in accordance with certain examples. The method 220 is described with reference to the components illustrated in FIG. 1.

In the examples described herein, the merchant system does not need to install hardware, for example, one or more beacon devices 120 and one or more point of sale ("POS") devices 160, at the example merchant system location in any particular order. The method 220 describes one example method of installing hardware at the merchant location. However, the merchant system or other system installing the merchant hardware does not need to install the one or more merchant POS devices 160 or the one or more beacon devices 120 in the order described herein.

In block 410, a merchant system registers with the account management system 130. In an example, an agent of the merchant system accesses an account management system website 139 and registers for a merchant system account with the account management system 130 via the website 139. In an example, the merchant system adds payment account information associated with a merchant system payment account to the merchant account managed by the account management system 130. In an example, the merchant system comprises one or more merchant system locations. For example, the merchant system may comprise one or more physical store locations. An example merchant location comprises one or more merchant point of sale ("POS") devices 160. In an example, one or more merchant POS device 160 operators operate the one or more merchant POS devices 160 at the merchant system location.

In block 420, a merchant system operator installs the payment application 163 on the merchant point of sale device 160. In another example, the merchant system operator purchases a merchant POS device 160 from the account management system 130 with the payment application 163 pre-installed on the merchant POS device 160. In an example, the merchant POS device 160 is able to communicate with the account management system 130 over a network 170 to receive the payment application 113. In an example, the merchant POS device 160 communicates with the account management system 130 via the payment application 163 over the network 170. For example, the merchant POS device 160 may be able to transmit transaction details to the account management system 130 via the payment application 163 over the network 170 to enable the account management system 130 to process a transaction. In another example, the merchant POS device 160 may be able to receive a receipt from the account management system 130 that notifies a merchant POS device 160 operator whether a transaction was successful or not.

In block 430, the merchant system operator installs a beacon device 120 at the merchant system location to correspond to the merchant POS device 160. In an example, the merchant system operator installs each beacon device 120 in proximity to an associated merchant POS device 160. An example merchant beacon device 120 is programmed to broadcast, emit, or otherwise transmit a particular merchant beacon device 120 code over a wireless network 170 to any user computing devices 110 within a threshold, predefined, or specified distance required to maintain the wireless network 170.

In an example, the account management system 130 receives the merchant point of sale device 160 identifier and associates it with a corresponding beacon device 120 code of a beacon device 120. In another example, the account management system 130 associates the merchant point of sale device 160 identifier with a merchant system location identifier corresponding to the merchant system location at which the merchant point of sale device 160 is installed. In an example, each installed beacon device 120 is associated by an account management system 130 with a particular merchant point of sale device 160 installed at the merchant system location. For example, the account management system 130 may comprise a database that correlates beacon device 120 codes with merchant point of sale device 160 identifiers and/or merchant system location identifiers for associated merchant point of sale devices 160 and/or merchant system locations. For example, a merchant point of sale device 160 identifier may comprise hardware identifier specific to the device such as a serial number or a MAC ID. In another example, a beacon device 120 code may comprise a hardware identifier specific to the beacon device or an identifier generated by the account management system 130 and stored in the beacon device 120. An example merchant system location identifier comprises an identifier uniquely identifying a particular merchant system location.

In block 440, the beacon device 120 broadcasts the beacon device code via a wireless communication network 170 at the location of the merchant system. In an example, the beacon device 120 broadcasts a beacon device code received from the account management system 130 via a local wireless network 170 at the merchant system location until receiving a new beacon device code from the account management system 130. In this example, in response to receiving the new beacon device code from the account management system 130 via the network 170, the beacon device 120 broadcasts the new beacon device code at the merchant system location via the local wireless network 170 until receiving a subsequent new beacon device code from the account management system 130.

In an example, the beacon device 120 broadcasts the merchant beacon code over a wireless network 170 medium, wherein one or more user computing devices 110 located within a threshold proximity to the beacon device 120 are able to receive the beacon device code over the local wireless network 170. In an example, only user computing devices 110 and/or devices located at the merchant system location are able to establish a predefined proximity to the beacon device 120 to enable communication with the beacon device 120 over the local wireless network 170. For example, the threshold proximity required to establish the local wireless network 170 connection depends on the network 120 communication protocol utilized by the beacon device 120. For example, the beacon device 120 may broadcast, emit, or otherwise transmit data comprising the beacon device code via Wi-Fi, Bluetooth, Bluetooth low energy ("BLE"), near field communication ("NFC"), or other appropriate communication protocol to one or more user computing devices 110 located at the merchant system location within a threshold proximity to the beacon device 120. In some examples, the beacon device 120, at a time before transmitting the beacon device code, is operable to establish a network 170 connection between the beacon device 120 and one or more user computing devices 110 and/or merchant POS devices 160 located at the merchant system location within a threshold, predefined, or specified proximity to the beacon device 120.

In certain examples, the beacon device 120 is a component of the merchant POS device 160 or is wirelessly or physically connected to the merchant POS device 160 and controlled by one or more processors of the merchant POS device 160. In certain examples, one or more functionalities performed by the beacon device 120 may also be performed by the merchant POS device 160.

From block 440, the method 220 proceeds to block 230 of FIG. 2.

Returning to FIG. 2, in block 230, the user 101 registers with the payment processing system 150. The method for registering, by a user 101, with a payment processing system 150 is described in more detail hereinafter with reference to the method 220 described in FIG. 4.

FIG. 4 is a block diagram depicting a method 220 for registering, by a user 101, with a payment processing system 150, in accordance with certain examples. The method 220 is described with reference to the components illustrated in FIG. 1.

Returning to FIG. 2, in block 230, the user 101 signs in to the payment application 113 via the user computing device 110 and enters the merchant system location. In an example, the user signs into the payment application 113 before entering the merchant system location. In another example, the user 101 signs in to the payment application 113 at the same time or after the user 101 enters the merchant system location. In an example, to sign in to payment application 113, the user 101 may enter a username and password associated with the user's 101 account management system account and select an object on the user interface 111 that reads "sign in." In this example, the payment application 113 communicates the username and password to the account management system 130 via the network 170. In this example, the account management system 130 validates the username and password for the user 101 account. In this example, if the username and password are correct, the account management system 130 establishes communication with the payment application 113 on the user computing device 110 via the network 170.

In block 240, the user computing device 110 receives the beacon device 120 code broadcast by a beacon device 120 and transmits a checkin signal to the account management system 130. The method for receiving, by a user computing device 110, a beacon device code 120 broadcast by a beacon device 120 and transmitting a checkin signal to an account management system 130 is described in more detail hereinafter with reference to the method 240 described in FIG. 5.

FIG. 5 is a block diagram depicting a method 240 for receiving, by a user computing device 110, a beacon device code 120 broadcast by a beacon device 120 and transmitting a checkin signal to an account management system 130, in accordance with certain examples. The method 240 is described with reference to the components illustrated in FIG. 1.

In block 510, the user 101 carries the user computing device 110 within a threshold distance of the beacon device 120 at the merchant system location. In an example, the threshold distance comprises a maximum distance between the beacon device 120 and the user computing device 110 necessary for the user computing device 110 to receive data from the beacon device 120 over a local wireless network 170 at the merchant system location. For example, the user 101 approaches the merchant POS device 160 with the user computing device 110.

In block 520, the user computing device 110 receives the beacon device 120 code broadcasted by the beacon device 120. In an example, the beacon device 120 continuously or periodically broadcasts the beacon device 120 code. For example, the beacon device 120 broadcasts the beacon device 120 code every five seconds. In an example, the user computing device 110 periodically receives the beacon device 120 code according to the frequency that the beacon device 120 transmits the code over the local wireless network 170. In an example, when the user 101 signs into the payment application 113, the payment application 113 operates in a foreground of the operating system of the user computing device 110. In this example, if the user 101 selects another application on the user computing device 110, the payment application 113 ceases to operate in the foreground and begins operating in a background of the operating system while the other, selected application operates in the foreground of the operating system of the user computing device 110. In another example, the user computing device 110 operates in a sleep mode or other power-saving mode wherein the user interface 111 of the user computing device is deactivated and wherein the payment application 113 operates in the background of the operating system of the user computing device. 110. In an example, only one application on the user computing device 110 may run in the foreground at any time. In this example, applications operating in the background have limited processing capabilities whereas an application operating in the foreground is able to freely execute on the user computing device 110. More specifically, the payment application 113 executing in the background of the operating system may not continue to detect a particular beacon device 120 when the particular beacon device 120 broadcasts the same beacon device 120 code. The payment application 113 initially detects the particular beacon device 120 based on the broadcast beacon device 120 code. In an example, the beacon device 120 code comprises a media access control ("MAC") address or hardware identifier associated with the beacon device 120. Thereafter, the payment application 113 only detects beacon device 120 codes for beacon devices that are different from the beacon device 120 code for the particular beacon device. In an example, the beacon device 120 at the location, broadcasts a first beacon device 120 code at the location via the Bluetooth Low-Energy ("BLE") network 170 or other wireless network at the location. In an example, the beacon device 120 broadcasts the beacon device 120 code and other data at the location via another type of local wireless network, for example, a Bluetooth network, a Wi-Fi network, an audio network, or near field communication ("NFC") network. In an example, the other data comprises a beacon device 120 name, a network 170 connection name, or other data. In an example, the payment application 113 operating in the background or foreground of the user computing device 110 operating system receives the first beacon device 120 code and the other data from the beacon device 120 via the BLE network 170 or other wireless network at the location.

In block 530, the user computing device 110 transmits a checkin signal and user 101 account identifier to the account management system 130. In an example, in response to receiving the beacon device 120 code, the payment application 113 logs a check in status of the user 101 and transmits a check-in status signal and the user 101 account identifier associated with the user 101 account to the account management system 130 via the network 170. In an example, in response to receiving the beacon device 120 code, the user computing device 110 logs location data of the user computing device 110 and transmits a checkin signal comprising the location data, a hardware identifier associated with the beacon device 120, and the user 101 account identifier to the account management system 130 via the network 170.

In block 540, the account management system 130 receives the checkin signal and user 101 account identifier.

In an example, the account management system 130 receives the checkin signal and user 101 account identifier via the network 170.

In block 550, the account management system 130 logs receipt of the checkin signal and user 101 account identifier and designates the user 101 account as checked in. In an example, the account management system 130 maintains a log of current user computing devices 110 currently checked in at the location associated with the beacon device 120. In an example, the log of current user computing devices 110 currently checked in at the location associated with the beacon device 120 is associated with a hardware identifier of the beacon device 120. In this example, as part of the checkin signal, the account management system 130 receives the hardware identifier of the beacon device 120 and identifies the log of current user computing devices 110 currently checked in at the location associated with the beacon device 120 based on the received hardware identifier. In another example, the log of current user computing devices 110 currently checked in at the location associated with the beacon device 120 is associated with location data. In this example, as part of the checkin signal, the account management system 130 receives location data logged by the user computing device 110 and identifies the log of current user computing devices 110 currently checked in at the location associated with the beacon device 120 based on the received location data. For example, the account management system 130 determines that the logged location data received from the user computing device 110 as part of the checkin signal is within a threshold distance from a location associated with the log of current user computing devices 110 currently checked in at the location associated with the beacon device 120. In an example, the account management system 130 logs the subsequent checkin signal in a memory or data storage unit 136. In an example, the account management system 130 maintains the log of current user computing devices 110 currently checked in at the location associated with the beacon device 120 in a data storage unit 136. In an example, the account management system 130 logs a current time stamp at the time of receipt of the checkin signal and associates the logged timestamp with the received checkin signal in the log of current user computing devices 110 currently checked in at the location associated with the beacon device 120. For example the logged timestamp comprises a time comprising a date, month, year, hour, minute, second, and/or other designation that identifies the time associated with the logged current timestamp.

From block 550, the method 240 proceeds to block 250 in FIG. 2.

Returning to FIG. 2, in block 250, the user computing device 110 receives a subsequent beacon device 120 code while the payment application 113 operates in the background of the user computing device 110 operating system and transmits a subsequent checkin signal to the account management system 130. The method for receiving, by a user computing device 110, a subsequent beacon device code 120 broadcast by a beacon device 120 while a payment application 113 is operating in a background of a user computing device 110 operating system and transmitting a subsequent checkin signal to an account management system 130 is described in more detail hereinafter with reference to the method 250 described in FIG. 6.

Figure 6:
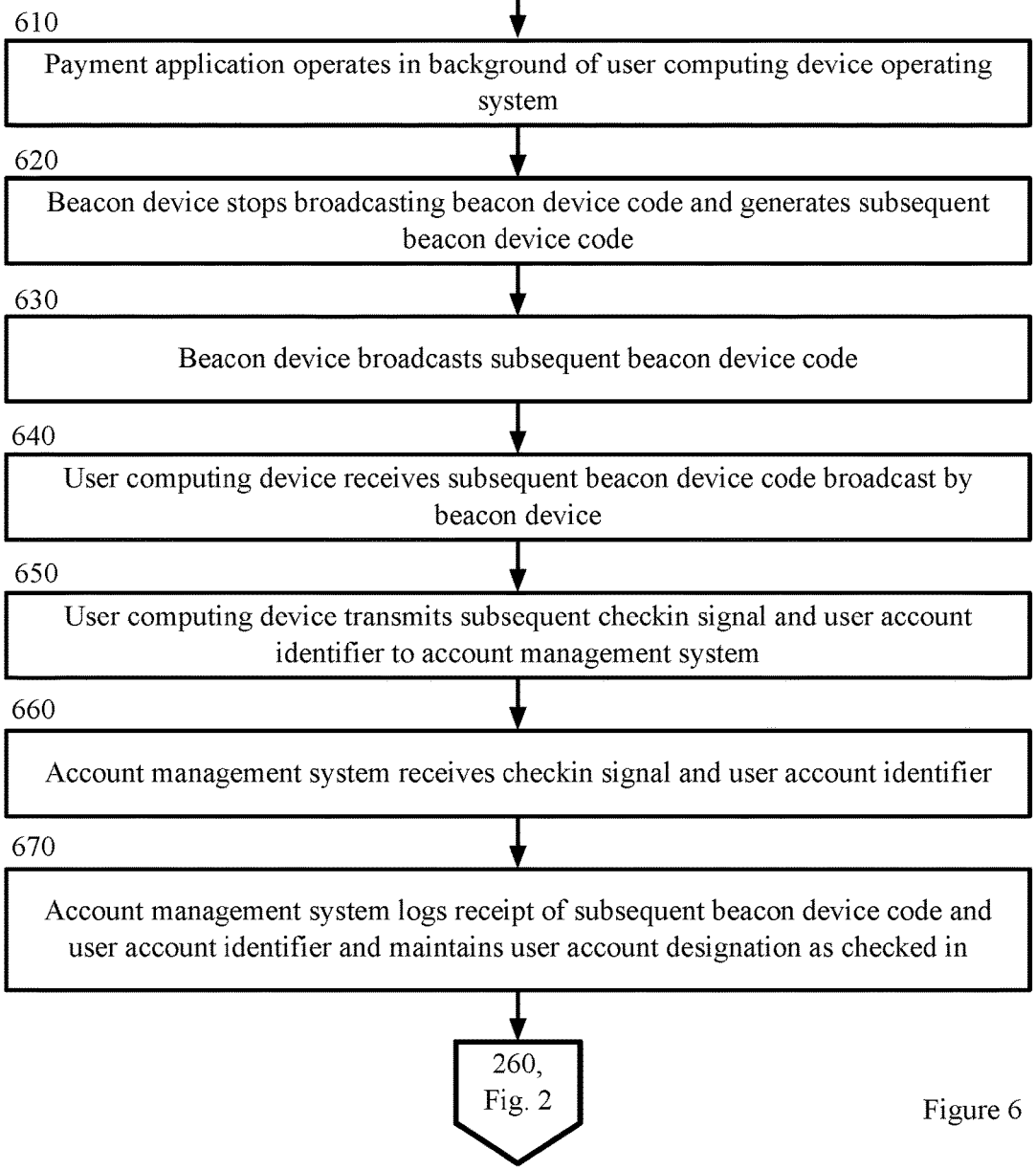
FIG. 6 is a block flow diagram depicting a method for receiving, by a user computing device, a merchant beacon identifier broadcasted by a merchant beacon device while a payment application is operating in the background of the user computing device operating system and transmitting a subsequent checkin signal to an account management system, in accordance with certain examples.

FIG. 6 is a block diagram depicting a method 250 for receiving, by a user computing device 110, a subsequent beacon device code 120 broadcast by a beacon device 120 while a payment application 113 is operating in a background of a user computing device 110 operating system and transmitting a subsequent checkin signal to an account management system 130, in accordance with certain examples. The method 250 is described with reference to the components illustrated in FIG. 1.

In block 610, the payment application 113 operates in the background of the user computing device 110 operating system. In an example, when the user 101 signs into the payment application 113, the payment application 113 operates in a foreground of the operating system of the user computing device 110. In this example, if the user 101 selects another application on the user computing device 110, the payment application 113 ceases to operate in the foreground and begins operating in a background of the operating system while the other, selected application operates in the foreground of the operating system of the user computing device 110. In this example, in response to the user 101 selecting or interacting with the payment application 113 while the payment application 113 is operating in the background on the user computing device 110, the payment application 113 begins to operate in the foreground of the user computing device 110. In this example, in response to the user 101 selecting or interacting with another application other than the payment application 113 on the user computing device 110, the payment application 113 operating in the foreground begins to operate in the background of the user computing device 110. In another example, the user computing device 110 operates in a sleep mode or other power-saving mode wherein the user interface 111 of the user computing device is deactivated and wherein the payment application 113 operates in the background of the operating system of the user computing device. 110. In an example, only one application on the user computing device 110 may run in the foreground at any time. In this example, applications operating in the background have limited processing capabilities whereas an application operating in the foreground is able to freely execute on the user computing device 110. More specifically, the payment application 113 executing in the background of the operating system may not continue to detect a particular beacon device 120 when the particular beacon device 120 broadcasts the same beacon device 120 code. The payment application 113 initially detects the particular beacon device 120 based on the broadcast beacon device 120 code. In an example, the beacon device 120 code comprises a media access control ("MAC") address or hardware identifier associated with the beacon device 120. Thereafter, the payment application 113 only detects beacon device 120 codes for beacon devices that are different from the beacon device 120 code for the particular beacon device.

In block 620, the beacon device 120 stops broadcasting the beacon device 120 code and generates a subsequent beacon device 120 code. In an example, the beacon device 120 broadcasts the beacon device 120 code for a specified length of time at specified intervals. For example, the beacon device 120 broadcasts the beacon device 120 code for five minutes at five second intervals. In another example, the beacon device 120 broadcasts the beacon device 120 code continuously for a specified length of time. In an example, the beacon device 120 generates a subsequent beacon device 120 code via a random number generator 123. The subsequent beacon device 120 code may comprise alphanumeric and/or symbolic characters generated by the random number generator 123. In an example, the initial beacon device 120 code comprises a hardware identifier or MAC address of the beacon device 120 and the subsequent beacon device 120 code comprises a code generated by the random number generator 123 different from the hardware identifier or MAC address.

In block 630, the beacon device 120 broadcasts the subsequent beacon device 120 code. In an example, the beacon device 120 broadcasts the subsequent beacon device 120 code and a hardware identifier associated with the beacon device 120 for a specified length of time at specified intervals. For example, the beacon device 120 broadcasts the subsequent beacon device 120 code for five minutes at five second intervals. In another example, the beacon device 120 broadcasts the subsequent beacon device 120 code continuously for a specified length of time. In an example, the beacon device 120 further generates successive beacon device 120 codes subsequent to the subsequent beacon device 120 code via a random number generator 123. In an example, the beacon device 120, after broadcasting the subsequent beacon device 120 code for the specified length of time, broadcasts each of the successive beacon device 120 codes for a specified length of time at specified intervals or continuously for the specified length of time. For example, every five minutes, the beacon device 120 broadcasts a new beacon device 120 code that is different from the previous beacon device 120 code broadcast by the beacon device 120. In an example, the beacon device 120 broadcasts the subsequent beacon device 120 code along with the other data at the merchant location via the BLE network 170 or other local wireless network 170.

In block 640, the user computing device 110 receives the subsequent beacon device 120 code broadcast by the beacon device 120. In an example, the user computing device 110 receives the subsequent beacon device 120 code broadcast by the beacon device 120 via the BLE network 170 or other wireless network at the merchant system location. In an example, the user computing device 110 payment application 113 is operating in the background on the operating system of the user computing device 110. In an example, because the subsequent beacon device 120 code is different than the beacon device 120 code previously received by the user computing device 110, the payment application 113 detects the subsequent beacon device 120 code.

In block 650, the user computing device 110 transmits a subsequent checkin signal and the user 101 account identifier to the account management system 130. In an example, in response to detecting the subsequent beacon device 120 code, the payment application 113 transmits, via the network 170, the subsequent checkin signal and the user 101 account identifier associated with the user 101 account to the account management system 130. In an example, in response to receiving the subsequent beacon device 120 code, the user computing device 110 logs subsequent location data of the user computing device 110 and transmits a subsequent checkin signal comprising the subsequent location data, a hardware identifier associated with the beacon device 120, and the user 101 account identifier to the account management system 130 via the network 170.

In block 660, the account management system 130 receives the subsequent checkin signal and the user 101 account identifier. For example, the account management system 130 receives the checkin signal, the user 101 account identifier, the hardware identifier of the beacon device 120, and/or location data from the user computing device 110 via the network 170. In an example, the log of current user computing devices 110 currently checked in at the location associated with the beacon device 120 is associated with a hardware identifier of the beacon device 120. In this example, as part of the subsequent checkin signal, the account management system 130 receives the hardware identifier of the beacon device 120 and identifies the log of current user computing devices 110 currently checked in at the location associated with the beacon device 120 based on the received hardware identifier. In another example, the log of current user computing devices 110 currently checked in at the location associated with the beacon device 120 is associated with location data. In this example, as part of the subsequent checkin signal, the account management system 130 receives subsequent location data logged by the user computing device 110 and identifies the log of current user computing devices 110 currently checked in at the location associated with the beacon device 120 based on the received subsequent location data. For example, the account management system 130 determines that the logged subsequent location data received from the user computing device 110 as part of the checkin signal is within a threshold distance from a location associated with the log of current user computing devices 110 currently checked in at the location associated with the beacon device 120

In block 670, the account management system 130 logs receipt of the subsequent checkin signal and user 101 account identifier and maintains the user 101 account designation as checked in. In an example embodiment, the account management system 130 identifies the user 101 account based on the received user 101 account identifier and logs the subsequent checkin signal as associated with the identified user 101 account. In an example, the account management system 130 logs the subsequent checkin signal in a memory or data storage unit 136. In an example, the account management system 130 monitors the log of current user computing devices 110 currently checked in at the location associated with the beacon device 120 in a data storage unit 136 and logs the subsequent checkin signal in the log of current user computing devices 110 currently checked in at the location associated with the beacon device 120. In an example, the account management system 130 logs a current time stamp at the time of receipt of the subsequent checkin signal and associates the logged timestamp with the received subsequent checkin signal in the log of current user computing devices 110 currently checked in at the location associated with the beacon device 120. For example the logged timestamp comprises a time comprising a date, month, year, hour, minute, second, and/or other designation that identifies the time associated with the logged current timestamp.

From block 670, the method 250 proceeds to block 260 in FIG. 2.

Returning to FIG. 2, in block 260, the account management system 130 monitors a checkin status for the user 101 account. For example, the account management system 130 monitors a log of current user computing devices 110 currently checked in at the location associated with the beacon device 120. In this example, the account management system 130 adds and deletes user 101 account identifiers associated with user computing devices 110 based on one or more checkin signals or subsequent checkin signals received from the user computing devices 110. The method for monitoring, by an account management system 130, a checkin status of a user 101 account is described in more detail hereinafter with reference to the method 260 described in FIG. 7.

Figure 7:
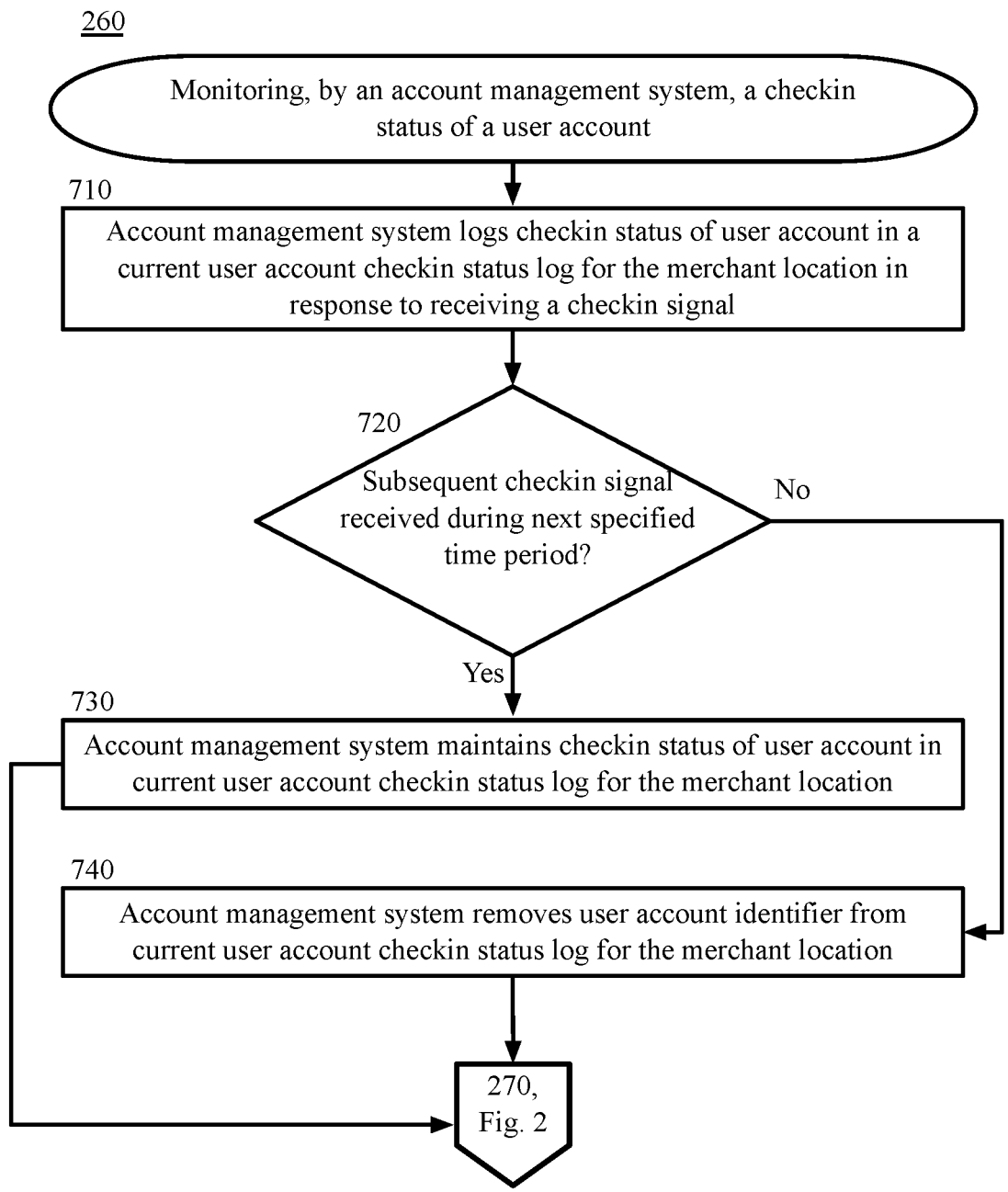
FIG. 7 is a block flow diagram depicting a method for monitoring, by an account management system, a checkin status for a user account, in accordance with certain examples.

FIG. 7 is a block diagram depicting a method 260 for monitoring, by an account management system 130, a checkin status of a user 101 account, in accordance with certain examples. The method 260 is described with reference to the components illustrated in FIG. 1.

In block 710, the account management system 130 logs a checkin status of a user 101 account in a current user 101 account checkin status log for the merchant location in response to receiving a checkin signal. For example, the current user 101 account checkin status log for the merchant location comprises the log of current user computing devices 110 currently checked in at the location associated with the beacon device 120. For example, the method for logging a checkin status of a user 101 account in a current user 101 account checkin status log for the merchant location is described in blocks 510-550 herein.

In block 720, the account management system 130 determines, after a specified time period, if a subsequent checkin signal has been received. For example, the account management system 130 logged an initial checkin signal received from the user computing device 110 for the user 101 account and the subsequent checkin signal is received at a time after receiving the initial checkin signal. In an example embodiment, the specified time period comprises thirty seconds, two minutes, five minutes, ten minutes, or other appropriate length of time.

If the account management system 130 does not receive a subsequent checkin signal after the specified period of time from time associated with the initial checkin signal, the method 260 proceeds to block 740. For example, the initial checkin signal for the user 101 account was received at 3:50:15 from the user computing device 110 over the network 170. In this example, the account management system 130 determines that the initial checkin signal for the user 101 account was received at 3:50:15 based on the timestamp associated with the logged checkin signal. In this example, at 3:56:30, the account management system 130 detects that no subsequent checkin signal has been received over the network 170 from the user computing device 110 and the specified period of time is five minutes. In this example, the account management system 130 determines that the account management system 130 has not received a subsequent checkin signal within the specified period of time from the user computing device 110 over the network 170.

In block 740, the account management system removes the user 101 account identifier from the current user 101 account checkin status log for the merchant location. For example, in response to determining that the account management system 130 has not received a subsequent checkin signal within the specified period of time from the user computing device 110 over the network 170, the account management system removes the user 101 account identifier from the current user 101 account checkin status log for the merchant location. In an example, at a time after removing the user 101 account identifier from the current user 101 account checkin status log for the merchant location, the account management system 130 may add the user 101 account identifier again to the current user 101 account checkin status log for the merchant location if the account management system 130 receives a subsequent checkin signal from the user computing device 110 over the network 170. For example, the example method for adding a user 101 account identifier to the current user 101 account checkin status log for the merchant location is described herein in FIG. 5.

From block 740, the method 260 proceeds to block 270 in FIG. 2.

Returning to block 720, if the account management system 130 receives a subsequent checkin signal after the specified period of time from logging the initial checkin signal, the method 260 proceeds to block 730. For example, the initial checkin signal for the user 101 account was received at 3:50:15 from the user computing device 110 over the network 170. In this example, at 3:53:30, the account management system 130 receives a subsequent checkin signal or otherwise detects that a subsequent checkin signal has been received over the network 170 from the user computing device 110 and the specified period of time is five minutes. In this example, the account management system 130 determines that the account management system 130 has received a subsequent checkin signal within the specified period of time from the user computing device 110 over the network 170.

In block 730, the account management system maintains the checkin status of the user 101 account in the user 101 account checkin status log for the merchant location. In an example embodiment, in response to determining that the account management system 130 has received a subsequent checkin signal within the specified period of time from the user computing device 110 over the network 170, the account management system 130 logs a subsequent timestamp and associates the subsequent timestamp with the logged subsequent checkin signal. In this example, the account management system deletes the checkin signal and the logged timestamp associated with the checkin signal and adds the subsequent checkin signal and the subsequent ogged timestamp associated with the subsequent checkin signal to the current user 101 account checkin status log for the merchant location.

From block 730, the method 260 proceeds to block 270 in FIG. 2.

Returning to FIG. 2, in block 270, the user 101 initiates a transaction at the merchant system point of sale device 160. The method for initiating, by a user 101, a transaction at a merchant point of sale device 130 is described in more detail hereinafter with reference to the method 270 described in FIG. 8. In the examples described herein, the user 101 initiates a "hands free transaction" at the merchant POS device 160. An example hands free transaction does not require any interaction with the user computing device 110 on the part of the user 101. In another example, a hands free transaction requires only minimal interaction with the user computing device 110 by the user 101.

Figure 8:
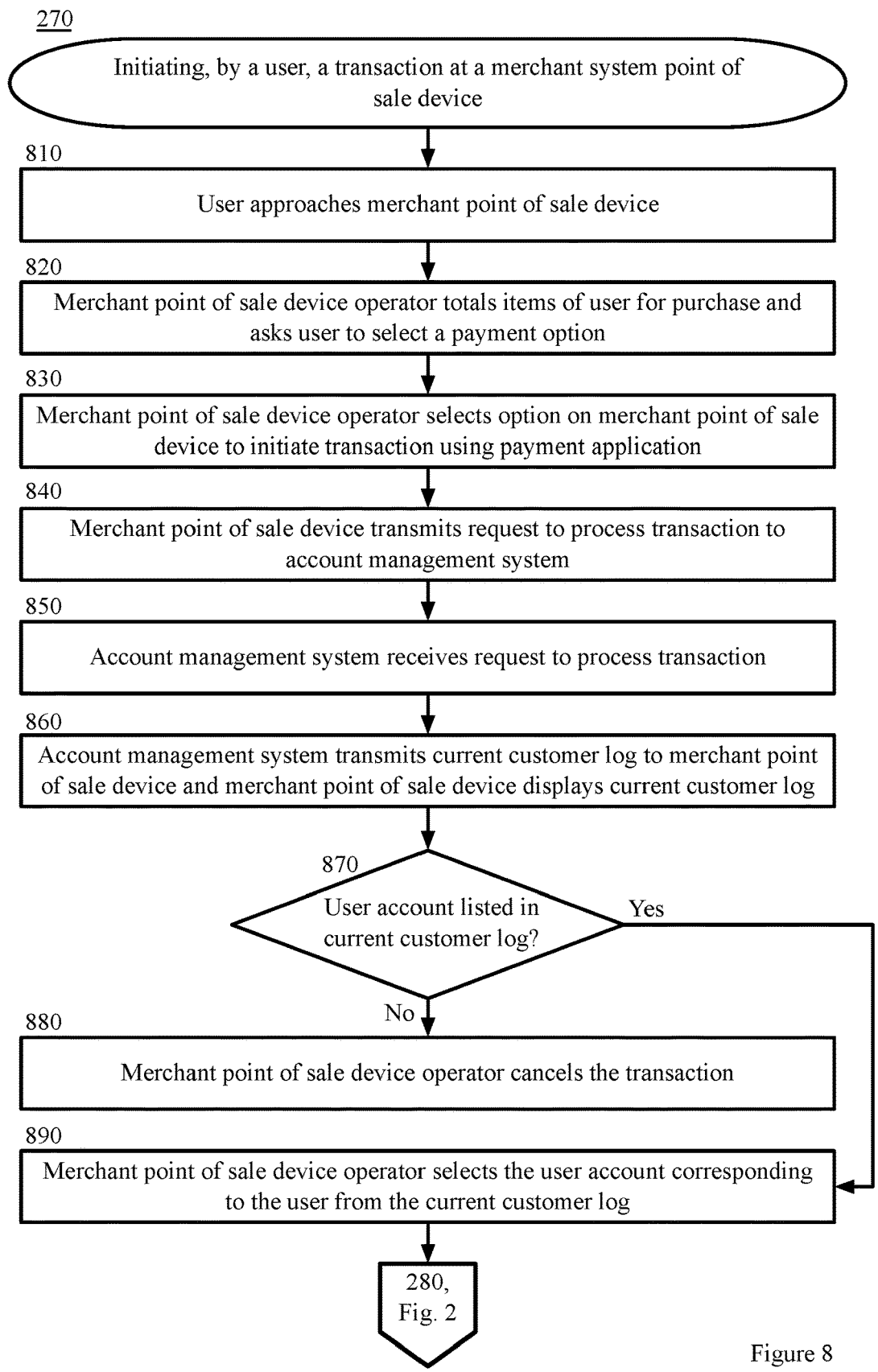
FIG. 8 is a block flow diagram depicting a method for initiating, by a user, a transaction at a merchant system point of sale device, in accordance with certain examples.

FIG. 8 is a block diagram depicting a method 270 for initiating, by a user 101, a transaction at a merchant point of sale device 160, in accordance with certain examples. The method 270 is described with reference to the components illustrated in FIG. 1.

In block 810, the user 101 approaches the merchant point of sale device 160. In an example, at a time prior to approaching the merchant POS device 160, the user 101 browses the merchant system location and selects one or more items to purchase. In this example, the user 101 may collect the one or more items and carry, or otherwise transport via physical basket or shopping cart, the one or more items to the merchant POS device 160.

In block 820, the merchant point of sale device 160 operator totals the items of the user 101 for purchase. In an example, the merchant POS device 160 operator scans barcodes attached to the one or more items or otherwise enters descriptions and prices associated with the one or more items into the merchant POS device 160. In an example, after scanning or manually entering the items into the merchant POS device 160, the merchant POS device operator actuates an object on the user interface 165 of the merchant POS device 160 via the payment application 163 to direct the merchant POS device 160 to total the items. In an example, the merchant POS device 160 displays, via the user interface 165, the total to the user 101. In an example, the merchant point of sale device 160 operator asks the user 101 to select a payment option. In an example, the merchant POS device 160 displays one or more payment options that the user 101 may select to use in a transaction. Example payment options may comprise payment via a payment application 113 associated with the account management system 130, payment by cash, payment by check, payment by credit card, payment by debit card, and/or any other means of payment that the merchant system can or is willing to accept for payment from the user 101. In an example, the one or more payment options are displayed as objects on the user interface 165 and are selectable by the merchant POS device 160 operator in response to the user 101 directing the merchant POS device 160 operator to make a selection. In an example, the user 101 directs the merchant point of sale device 160 operator to initiate a transaction via the payment application 113. In an example, in response to receiving a verbal request from the user 101 to select the payment application 113 as a payment option, the merchant POS device 160 operator actuates an object on the user interface 165 of the merchant POS device 160 corresponding to the payment application 113 payment option.

In block 830, the merchant point of sale device 160 operator selects an option on the merchant point of sale device 160 to initiate a transaction using the payment application 113. In an example, the merchant POS device 160 displays a confirmation screen after the merchant POS device 160 operator selects an option to initiate a transaction using the payment application 113. An example confirmation screen may display information summarizing the potential transaction and comprising one or more of a transaction total, a description of the one or more items being purchased by the user 101, and a indication that the user 101 selected the payment application 113 as the method of payment for the transaction. An example confirmation screen may further display options to confirm the transaction or cancel the transaction. In an example, the user 101 reviews the confirmation screen, determines that the information displayed on the confirmation screen is correct, determines to continue with the transaction, and directs the merchant POS device 160 operator to select the option to confirm the transaction via the user interface 165.

In another example, the user 101 decides to abandon the transaction because the information is incorrect or because the user 101 changed his mind and decided not to purchase the items. In yet another example, the confirmation screen further comprises an option to edit the transaction details. In this example, the merchant POS device 160 operator, upon direction of the user 101, may select the option to edit the transaction details and may then edit, add, or delete one or more of the items in the transaction or edit payment details or payment methods for the transaction.

In block 840, the merchant point of sale device 160 transmits a request to process a transaction to the account management system 130. In an example, the merchant point of sale device 160 transmits a request to process a transaction to the account management system 130 comprising a point of sale device 160 username and password via the network 170. In an example, when the merchant system registers with the account management system 130, the merchant system establishes a separate username and password associated with each merchant POS device 160 at a merchant system location. In an example, the merchant POS device 160 operator configures the username and password associated with the merchant POS device 160 via the payment application 163 of the merchant POS device 160.

In this example, the account management system 130 maintains a database comprising a merchant POS device 160 identifier for each merchant POS device 160 at a merchant system location. For example, the merchant POS device 160 identifier may comprise a media access control ("MAC") address or an internet protocol ("IP") address.

In block 850, the account management system 130 receives the request to process the transaction. In an example, the account management system 130 receives the request to process the transaction and the point of sale device 130 username and password via the network 170. In an example, the account management system 130 identifies the merchant POS device 130 and the merchant system location based on the received username and password associated with the merchant POS device 160.

In block 860, the account management system 130 transmits the current customer log to the merchant point of sale device 160 and the merchant point of sale device 160 displays the current customer log. In an example, the account management system 130 identifies retrieves the current customer log for the identified merchant system location. For example, embodiment, the current customer log comprises the log of current user computing devices 110 currently checked in at the location associated with the beacon device 120. In an example, the log of current user computing devices 110 currently checked in at the location comprises a list of user computing devices 110 for which checkin signals and/or subsequent checkin signals have been received within a specified length of time. In an example embodiment, the account management system 130 transmits the current customer log along with user 101 facial images, challenges and/or responses associated with each user 101 account, or other identification data associated with each user computing device 110 or user 101 account listed on the log of current user computing devices 110 currently checked in at the location associated with the beacon device 120.

In block 870, the merchant POS device 160 operator determines whether the user 101 account is listed in the current customer log. In certain examples, the merchant POS device 160 operator identifies the user 101 via a challenge and a response. For example, the merchant POS device 160 operator 102 issues a challenge to the user 101. In an example, the merchant POS device 160 operator asks the user 101 for the initials of the user 101. In another example, the merchant POS device 160 operator asks the user 101 for the last four digits of a phone number of the user 101. In another example, the merchant POS device 160 operator asks the user 101 for a configured password. Any suitable challenge may be issued by the merchant POS device 160 operator. In an example, the response to the challenge does not provide any secure or private information. In this example, the user 101 provides a challenge response. As described in the example challenges, the responses may be the initials of the user 101, the last four digits of the phone number of the user 101, a configured password, or any other data associated with the user 101. Any configured challenge response may be utilized. In certain embodiments, the response may be a spoken response, a hand gesture, a keypad entry, a display of an identification card, or any suitable response. In an example, the point of sale device 130 operator inputs the response into the merchant point of sale device 160. The merchant POS device 160 operator inputs the challenge response of the user 101. In an example, if the user 101 indicates that the initials of the user 101 are "AC," then the merchant POS device operator inputs "AC" into the payment application 163 of the merchant POS device 160. In an example, the user interface 165 of the merchant POS device 160 displays a request for an entry of the response of the user 101. The merchant POS device operator enters the response via a virtual or physical keyboard, voice dictation, or in any suitable manner. In an alternate example, the user 101 enters the response into the user interface 165 of the merchant POS device 160. In this example, the merchant point of sale device 130 displays potential users 101 based on the challenge response. The merchant POS device 160 displays potential users 101 based on the challenge response. A list of users 101 that are associated with the challenge response are displayed on the merchant POS device 160 to the merchant POS device 160 operator. For example, if ten customers are in the vicinity of the associated merchant beacon device 120 and the user computing devices 110 associated with each of the ten customers transmitted a checkin signal or subsequent checkin signal to the account management system 130, then the merchant POS device 160 may have received from the account management system 130 a challenge response associated with each of user 101 accounts of the respective ten customers along with the current customer log. When the merchant POS device 160 receives the challenge response input, only the potential users 101 that are associated with the challenge response are displayed from the current customer log to the merchant POS device 160 operator via the user interface 165.

The payment application 163 may display a picture of the potential user 101 accounts that are presented to the merchant POS device 160 operator. For example, each user 101 may associate a picture with a user 101 account. When the merchant POS device 160 presents the one or more potential user 101 accounts to the merchant POS device operator, the merchant POS device operator may select the appropriate user 101 account based on the picture matching the user 101 conducting the transaction. Other identifying information may be presented instead of, or in addition to, a picture. For example, the name of the user 101 may be displayed and the merchant POS device operator 102 may identify the potential user 101 with that name. Any other suitable identifying information may be presented.

If the merchant POS device 160 operator determines that the user 101 account is not listed in the current customer log, the method 270 proceeds to block 880. For example, the current customer log does not comprise information associated with the user 101 desiring to conduct the transaction and/or the merchant POS device 160 operator is unable to identify the user 101 based on information in the current customer log and/or information provided by the user 101 during checkout.

In block 880, the merchant POS device 160 operator cancels the transaction. For example, none of the facial images, account information, or other identifying information in the displayed current customer log match any of the information of the user 101 desiring to conduct the transaction. In an example, the merchant POS device 160 operator may cancel the transaction by actuating an object on the user interface 165 of the merchant POS device 160, notify the user 101 of the discrepancy, or perform any other suitable action. In another example, the merchant POS device 160 interacts with the user interface 165 to instruct the merchant POS device 160 to request an alternative payment method from the user 101 for use in the transaction.

Returning to block 870, if the merchant POS device 160 operator determines that the user 101 account is listed in the current customer log, the method 270 proceeds to block 890.

In block 890, the merchant POS device 160 operator selects the user 101 account corresponding to the user 101 from the current customer log. For example, the merchant point of sale device operator selects the user 101 account for use in a transaction. After identifying the displayed picture of the user 101, the merchant POS device 160 operator may input a selection of the user 101 by actuating a user interface 165 control associated with the picture, or by inputting the selection in any suitable manner.

In an example, only a single user 101 account is presented in the list of potential users 101. If only a single user 101 account is identified, then the method may proceed after the merchant POS device 160 operator verifies that the displayed picture matches the user 101. If the picture doesn't match, then the merchant POS device 160 operator may cancel the transaction, notify the user 101 of the discrepancy, or perform any other suitable action. In certain examples, the merchant POS device 160 operator may take further steps to verify the identity of the user 101 before proceeding with selecting the user 101 identifier for the transaction, for example, by requesting to view an identity document of the user 101

From block 890, the method 270 proceeds to block 280 in FIG. 2.

Returning to FIG. 2, in block 280, the account management system 130 processes the transaction initiated at the merchant system location. The method 280 for processing, by an account management system 130, a transaction is described in more detail hereinafter with reference to the method 280 described in FIG. 9.

Figure 9:
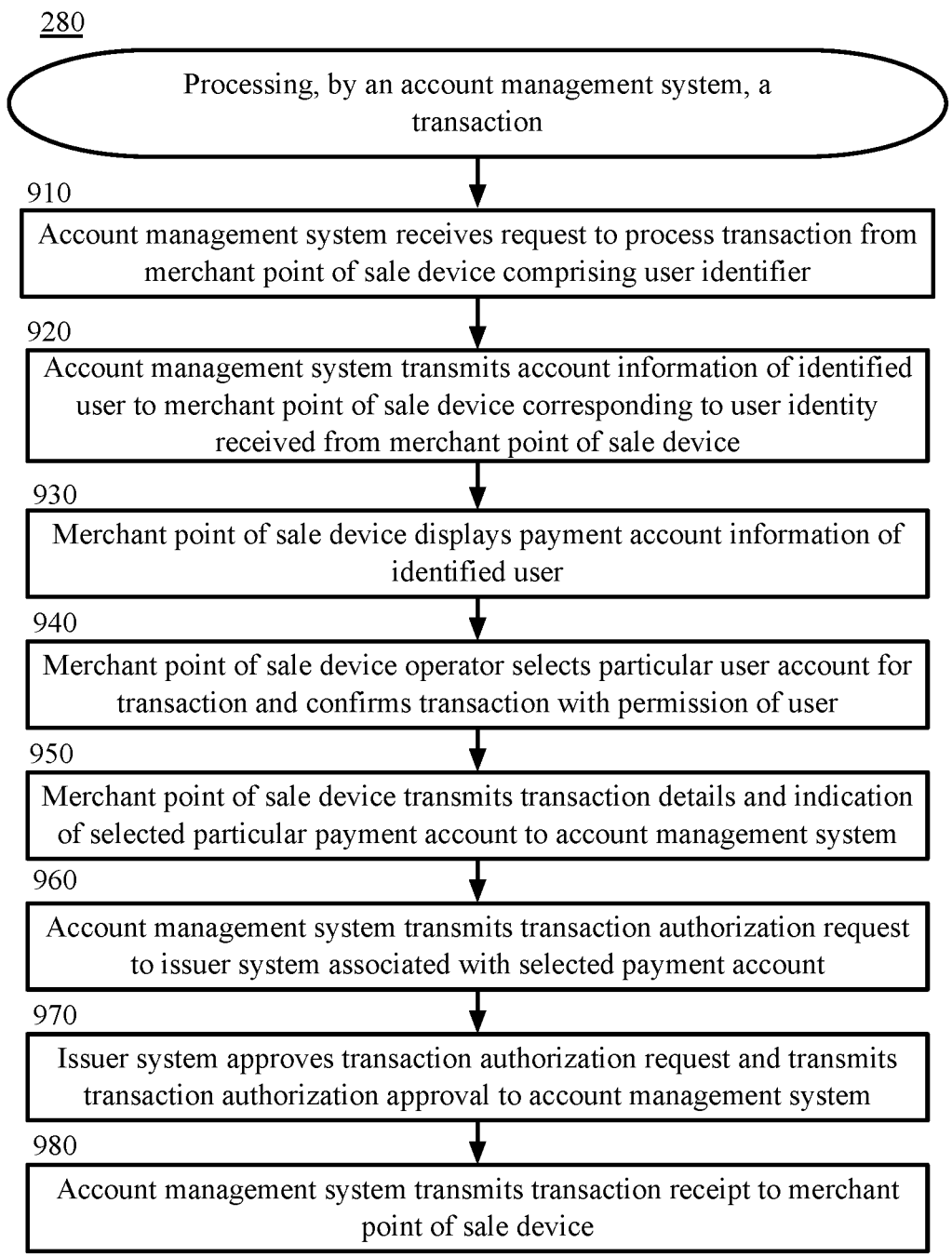
FIG. 9 is a block flow diagram depicting a method for processing, by an account management system, a transaction, in accordance with certain examples.
Figure 10:
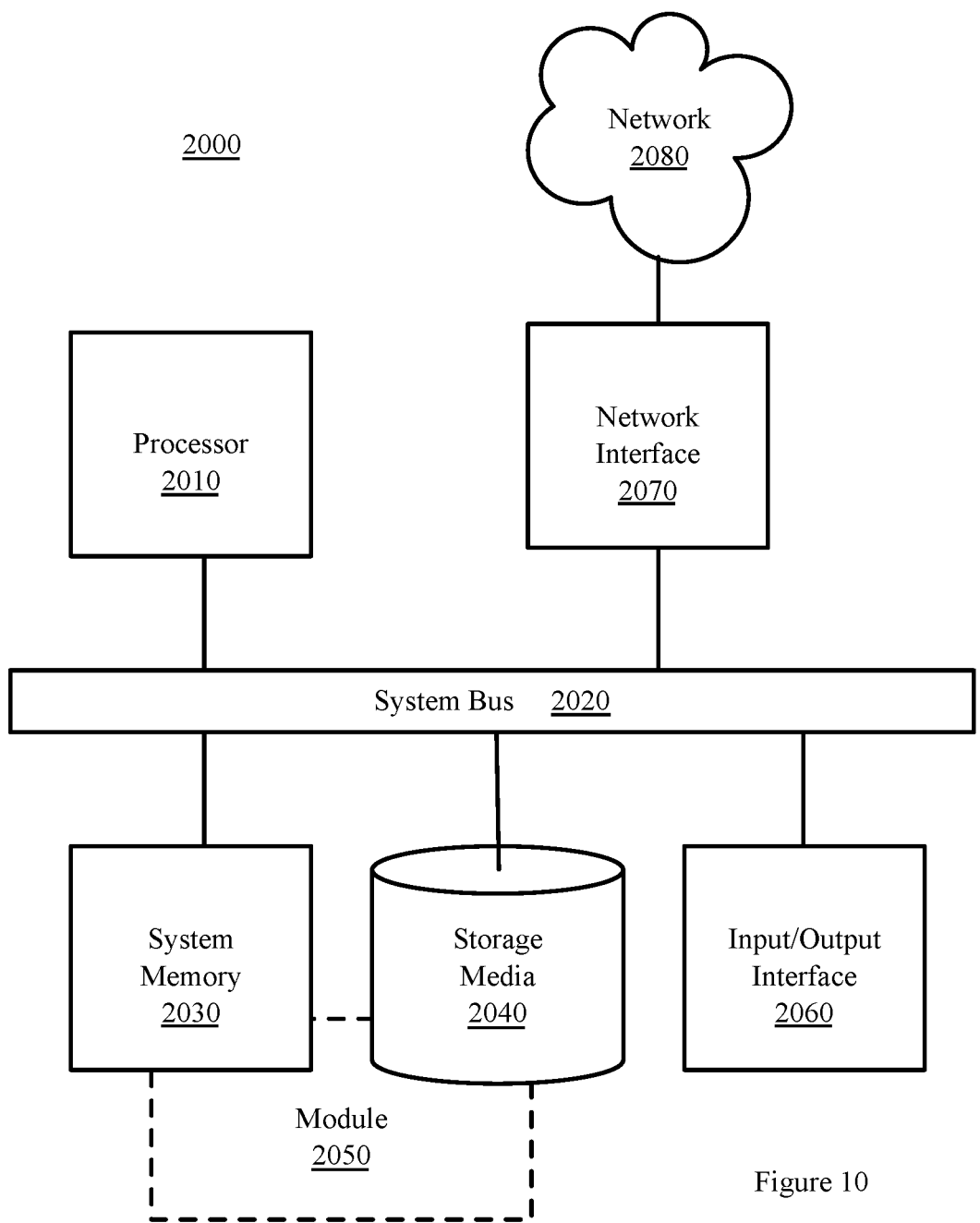
FIG. 10 is a block diagram depicting a computing machine and module, in accordance with certain examples.

FIG. 9 is a block diagram depicting a method 280 for processing, by an account management system 130, a transaction, in accordance with certain examples. The method 280 is described with reference to the components illustrated in FIG. 1.

In block 910, the account management system 130 receives a request to process a transaction from the merchant POS device 160 comprising the user 101 identifier. For example, in response to the merchant point of sale device operator selecting the user 101 account for use in a transaction, the merchant POS device 160 transmits the user 101 account identifier associated with the selected user 101 account or otherwise transmits an indication of the selection of the user 101 account to the account management system 130 via the network 170 along with a request to process the transaction. In an example, the account management system 130 further transmits transaction details to the account management system 130 via the network 170 comprising a merchant system payment account identifier, a total amount of the transaction, a description of one or more items being purchased in the transaction, and other relevant transaction details. The transaction details may comprise information necessary to the account management system 130 to process a transaction, such as an expiration date associated with the merchant system payment account or an address of the merchant system. In an example, the account management system 130 already comprises some or all of the transaction details in an account associated with the merchant system.

In block 920, the account management system 130 transmits account information of the selected user 101 account to the merchant point of sale device 160. For example, the user 101 account with the account management system 130 comprises payment account information associated with one or more payment accounts of the user 101. An example payment account of the user 101 comprises a credit account, bank account, stored value account, gift card, merchant system charge account, or other relevant user 101 account. In an example, the merchant POS device 130 does not receive complete payment information for one or more of the user 101 payment accounts. For example, the payment information may be obfuscated, occluded, or truncated. For example, the merchant POS device 160 may only receive abbreviated payment information sufficient for a user 101 to identify a payment account via the user interface 165.

In block 930, the merchant point of sale device 160 displays accounts of the selected user 101. In an example, the merchant POS device 160 does not display complete account information of the user 101 on the user interface 165. For example, for a credit card account, the merchant POS device user interface 165 may display only the name associated with the credit card, last four digits of the credit card number, and the expiration date.

In block 940, the merchant point of sale device 160 operator selects a user 101 account for transaction and confirms the transaction with permission of the user 101. For example, the user 101 views the account options directly displayed on the user interface 165 or listens to the merchant POS device 160 operator read the user 101 payment account options to the user 101. In an example, the user 101 selects a payment account option to use in the transaction. For example, the user 101 decides to use a credit card account. In an example, the user 101 communicates a selection of a payment account for use in the transaction to the merchant POS device 160 operator. In an example, in response to receiving the user's 101 indication of the payment account, the merchant POS device 160 operator selects the payment account indicated by the user 101 on the merchant POS device user interface 165.

In block 950, the merchant point of sale device 160 transmits transaction details and an indication of the selected particular payment account to the account management system 130. For example, the merchant POS device 160 transmits transaction details comprising a transaction total, an account identifier of the merchant system, and the selection of the user 101 account payment option. In an example, the account management system 130 receives the transaction details over the network 170. In an example, the account management system 130 extracts payment account information from the user 101 account corresponding to the received selection of the user 101 payment account.

In block 960, the account management system 130 transmits a transaction authorization request to an issuer system 140. In an example, the account management system 130 generates a transaction authorization request comprising user 101 payment account information, merchant system payment account information, and a total amount of the transaction. In an example, the account management system 130 receives the transaction authorization request from the account management system 130 via the network 170.

In block 970, the issuer system 140 approves the transaction authorization request and transmits a transaction authorization approval to the payment processing system 150. In an example, the issuer system 140 subtracts the user's 101 current account balance from the user's 101 credit limit associated with the user's 101 credit account. In an example, if the different between the credit limit and the credit balance is a positive number greater than the total amount of the transaction, the issuer system 140 approves the transaction authorization. For example, the user 101 will not exceed his credit limit if the transaction were to be approved, therefore the issuer system 140 approves the transaction authorization request. In an example, the payment processing system 150 receives the transaction authorization approval from the issuer system 140. In another example, the payment processing system 150 receives a denial of the transaction authorization request in response to the issuer system 140 declining the transaction authorization request. In an example, if the issuer system 140 approves the transaction authorization request, the issuer system 140 credits the merchant system account and adds a charge to the user 101 credit account statement, bank account statement, or other appropriate statement.

In block 980, the account management system 130 transmits a transaction receipt to the merchant point of sale device 160. For example, the account management system 130 transmits a confirmation of the approval of the transaction or a notice of a declined transaction to the merchant POS device 160 over the network 170. In an example, the merchant POS device 160 prints a receipt comprising a summary of a successful or unsuccessful transaction via a printer device that is a component of or otherwise communicatively coupled to the merchant POS device 160. In another example, the account management system 130 may transmit a transaction receipt to the user computing device 110 to be displayed on the user computing device. In yet another example, the merchant POS device 160 transmits a transaction receipt to the user computing device 110 to be displayed on the user computing device.

Other Examples

FIG. 2 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to enable repeat checkin signals by user computing devices via periodically changing beacon device codes, comprising:
   receiving, by a user computing device and from a beacon device at a location of a service provider system, a first beacon device code using an application operating in a background of an operating system of the user computing device;
   in response to receiving the first beacon device code, transmitting, by the user computing device to one or more computing devices using the application operating in the background of the operating system of the user computing device, a first checkin signal comprising a user computing device identifier and a user account identifier associated with a user account;
   at a time after receiving the first beacon device code, receiving, by the user computing device and from the beacon device, a second beacon device code using the application operating in the background of the operating system of the user computing device, wherein the second beacon device code is different from the first beacon device code; and
   in response to receiving the second beacon device code, transmitting, by the user computing device to the one or more computing devices using the application operating in the background of the operating system of the user computing device, a second checkin signal comprising the user computing device identifier and the user account identifier.

2. The method of claim 1, further comprising, in response to receiving the first beacon device code, logging, by the user computing device, first location data of the user computing device and transmitting the first location data to the one or more computing devices along with the first checkin signal.

3. The method of claim 1, further comprising, in response to receiving the second beacon device code, logging, by the user computing device, second location data of the user computing device and transmitting the second location data to the one or more computing devices along with the second checkin signal.

4. The method of claim 1, wherein, in response to receiving the first checkin signal, the one or more computing devices log a checkin status for the user account and a first timestamp.

5. The method of claim 4, wherein, in response to receiving the second checkin signal within a specified amount of time from the time of the first timestamp, the one or more computing devices log a checkin status for the user account.

6. The method of claim 1, wherein the first beacon device code comprises a first random number generated by the beacon device and wherein the second beacon device code comprises a second random number generated by the beacon device.

7. A computer program product, comprising:
   a non-transitory computer-readable medium having computer-executable instructions embodied thereon that when executed by a computer cause the computer to enable repeat checkin signals by user computing devices via periodically changing beacon device codes, the computer-executable program instructions comprising:
  computer-executable program instructions to receive, from a beacon device using an application operating in a background of the operating system of a computer, a first beacon device code;
  in response to receiving the first beacon device code, computer-executable program instructions to transmit, to one or more computing devices using the application operating in the background of the operating system of the computer, a first checkin signal comprising a user computing device identifier and a user account identifier associated with a user account;
  at a time after receiving the first beacon device code, computer-executable program instructions to receive, from the beacon device using the application operating in the background of the operating system of the computer, a second beacon device code, wherein the second beacon device code is different from the first beacon device code; and
  in response to receiving the second beacon device code, computer-executable program instructions to transmit, to the one or more computing devices using the application operating in the background of the operating system of the computer, a second checkin signal comprising the user computing device identifier and the user account identifier.

8. The computer program product of claim 7, further comprising:
  computer-executable program instructions to log, in response to receiving the first beacon device code, first location data of the user computing device; and
  computer-executable program instructions to transmit the first location data to the one or more computing devices along with the first checkin signal.

9. The computer program product of claim 7, further comprising:
  computer-executable program instructions to log, in response to receiving the second beacon device code, second location data of the user computing device; and
  computer-executable program instructions to transmit the second location data to the one or more computing devices along with the second checkin signal.

10. The computer program product of claim 7, wherein, in response to receiving the first checkin signal, the one or more computing devices log a checkin status for the user account and a first timestamp.

11. The computer program product of claim 10, wherein, in response to receiving the second checkin signal within a specified amount of time from the time of the first timestamp, the one or more computing devices log a checkin status for the user account.

12. The computer program product of claim 7, wherein the first beacon device code comprises a first random number generated by the beacon device and wherein the second beacon device code comprises a second random number generated by the beacon device.

13. The computer program product of claim 7, wherein the beacon device is located at a location of a service provider system.

14. A checkin system to enable repeat checkin signals by user computing devices via periodically changing beacon device codes, comprising:
  a storage device; and
  a processor communicatively coupled to the storage device, wherein the processor executes application code instructions that are stored in the storage device to cause the checkin system to:
    receive, from a beacon device using an application operating in a background of an operating system of the checkin system, a first beacon device code;
    in response to receiving the first beacon device code, transmit, to one or more computing devices using the application operating in a background of the operating system of the system, a first checkin signal comprising a user computing device identifier and a user account identifier associated with a user account;
    at a time after receiving the first beacon device code, receive, from the beacon device using the application operating in a background of the operating system of the system, a second beacon device code, wherein the second beacon device code is different from the first beacon device code; and
    in response to receiving the second beacon device code, transmit, to the one or more computing devices using the application operating in a background of the operating system of the system, a second checkin signal comprising the user computing device identifier and the user account identifier.

15. The system of claim 14, wherein the processor is further configured to execute application code instructions that are stored in the storage device to cause the system to:
  log, in response to receiving the first beacon device code, first location data of the user computing device; and
  transmit the first location data to the one or more computing devices along with the first checkin signal.

16. The system of claim 14, wherein the processor is further configured to execute application code instructions that are stored in the storage device to cause the system to:
  log, in response to receiving the second beacon device code, second location data of the user computing device; and
  transmit the second location data to the one or more computing devices along with the second checkin signal.

17. The system of claim 14, wherein, in response to receiving the first checkin signal, the one or more computing devices log a checkin status for the user account and a first timestamp.

18. The system of claim 17, wherein, in response to receiving the second checkin signal within a specified amount of time from the time of the first time stamp, the one or more computing devices log a checkin status for the user account.

19. The system of claim 14, wherein the first beacon device code comprises a first random number generated by the beacon device and wherein the second beacon device code comprises a second random number generated by the beacon device.

20. The system of claim 14, wherein the beacon device is located at a location of a service provider system.

* * * * *